United States Patent [19]

Noh et al.

[11] Patent Number: 5,394,845
[45] Date of Patent: Mar. 7, 1995

[54] INTAKE SYSTEM FOR ENGINE

[75] Inventors: Yoshihisa Noh; Yoshihiko Imamura; Fumihiko Saito; Kazuhiko Hashimoto; Masanori Misumi, all of Hiroshima, Japan

[73] Assignee: Mazda Motor Corporation, Hiroshima, Japan

[21] Appl. No.: 961,295

[22] Filed: Oct. 15, 1992

[30] Foreign Application Priority Data

Oct. 15, 1991 [JP] Japan ................. 3-266074
Oct. 15, 1991 [JP] Japan ................. 3-266076

[51] Int. Cl.⁶ ............................ F02B 31/00
[52] U.S. Cl. ................. 123/308; 123/188.14; 123/432
[58] Field of Search ........... 123/302, 308, 432, 188.14

[56] References Cited

U.S. PATENT DOCUMENTS

| | | | |
|---|---|---|---|
| 4,494,504 | 1/1985 | Yagi et al. | 123/432 |
| 4,726,343 | 2/1988 | Kruger | 123/432 |
| 4,727,719 | 3/1988 | Mizutani | 123/432 |
| 4,760,821 | 8/1988 | Aupor et al. | 123/308 |
| 4,762,102 | 8/1988 | Kanda | 123/302 |
| 5,060,616 | 10/1991 | Nakagawa et al. | 123/432 |
| 5,119,784 | 6/1992 | Hashimoto et al. | 123/432 |
| 5,119,785 | 6/1992 | Saito et al. | 123/432 |

FOREIGN PATENT DOCUMENTS

| | | | |
|---|---|---|---|
| 2853576 | 7/1979 | Germany | 123/308 |
| 0056621 | 4/1982 | Japan | 123/308 |
| 58-10565 | 2/1983 | Japan . | |
| 59-54732 | 3/1984 | Japan . | |
| 61-84135 | 6/1986 | Japan . | |
| 61-218726 | 9/1986 | Japan . | |
| 61-175541 | 11/1986 | Japan . | |
| 2-14405 | 1/1990 | Japan . | |
| 0837085 | 6/1960 | United Kingdom | 123/308 |
| 2087975 | 6/1982 | United Kingdom | 123/432 |
| WO86/05237 | 9/1986 | WIPO . | |

Primary Examiner—E. Rollins Cross
Assistant Examiner—Erick Solis
Attorney, Agent, or Firm—Keck, Mahin & Cate

[57] ABSTRACT

An engine intake system includes a primary port for introducing intake gas throughout an entire engine operating condition. A secondary port is provided with a gate valve which is opened in a high engine load condition for introducing the intake gas. A ratio of a tumble flow to a swirl flow is gradually increased as the gate valve is operated from an entirely closed condition to a fully open condition. According to this invention, ignition and combustion characteristics can be improved.

20 Claims, 20 Drawing Sheets

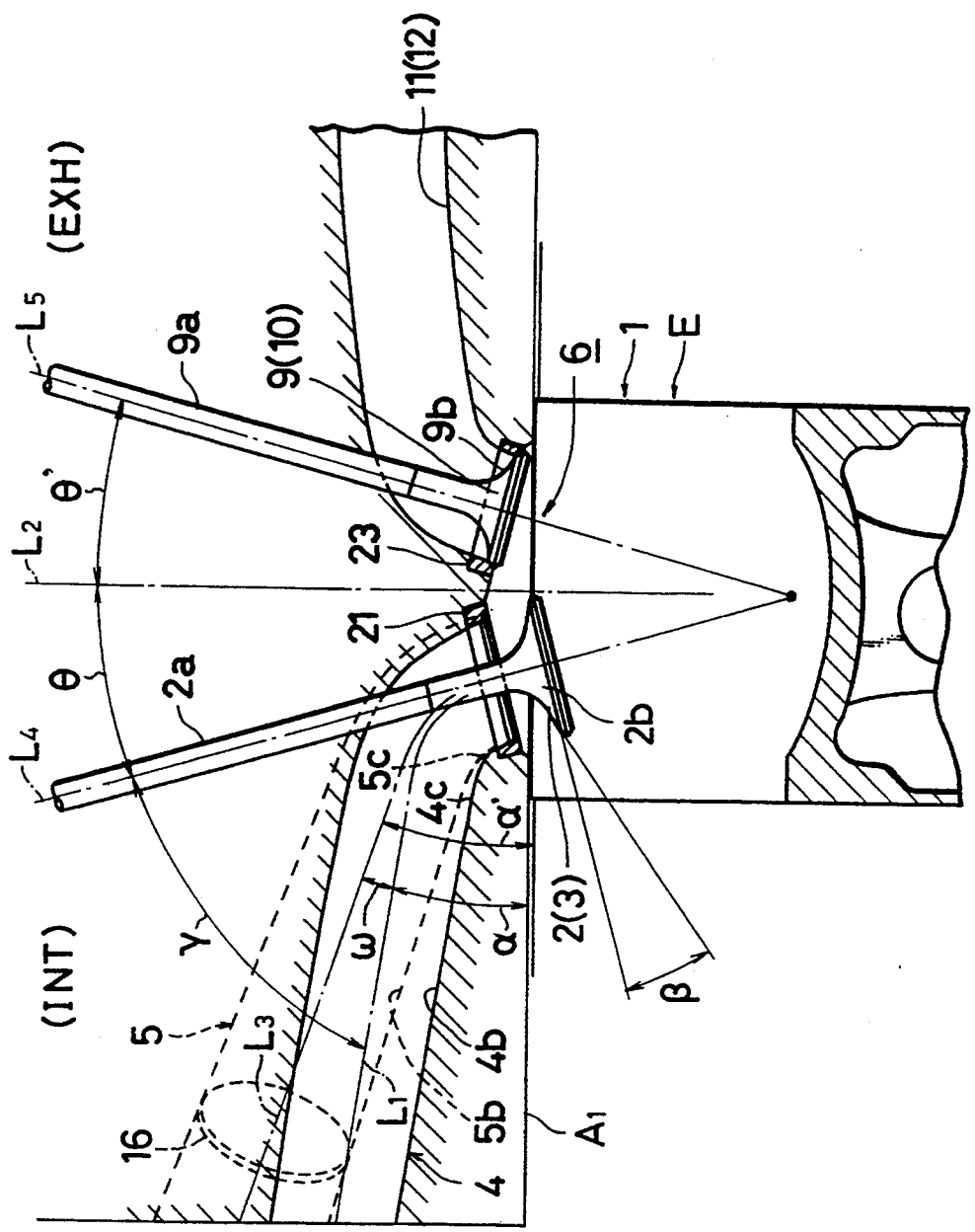

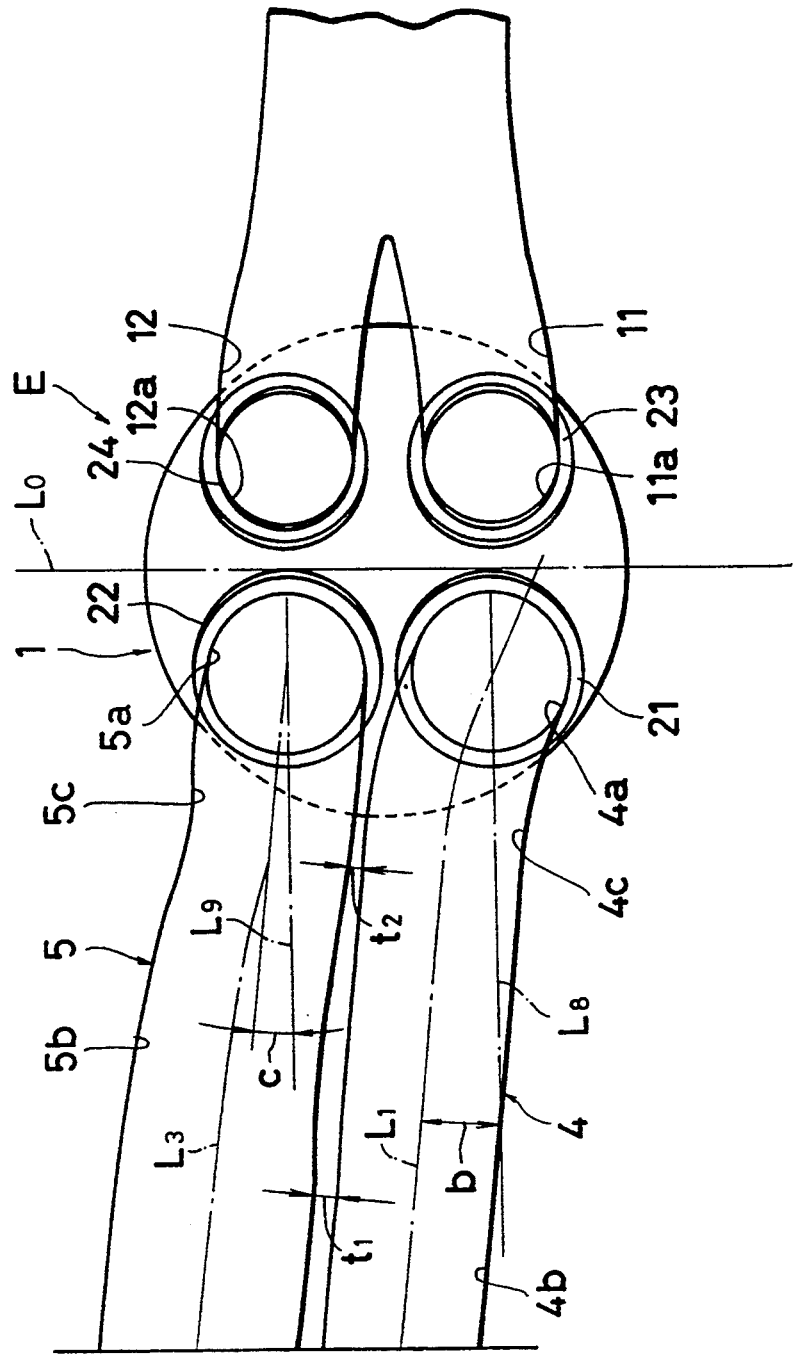

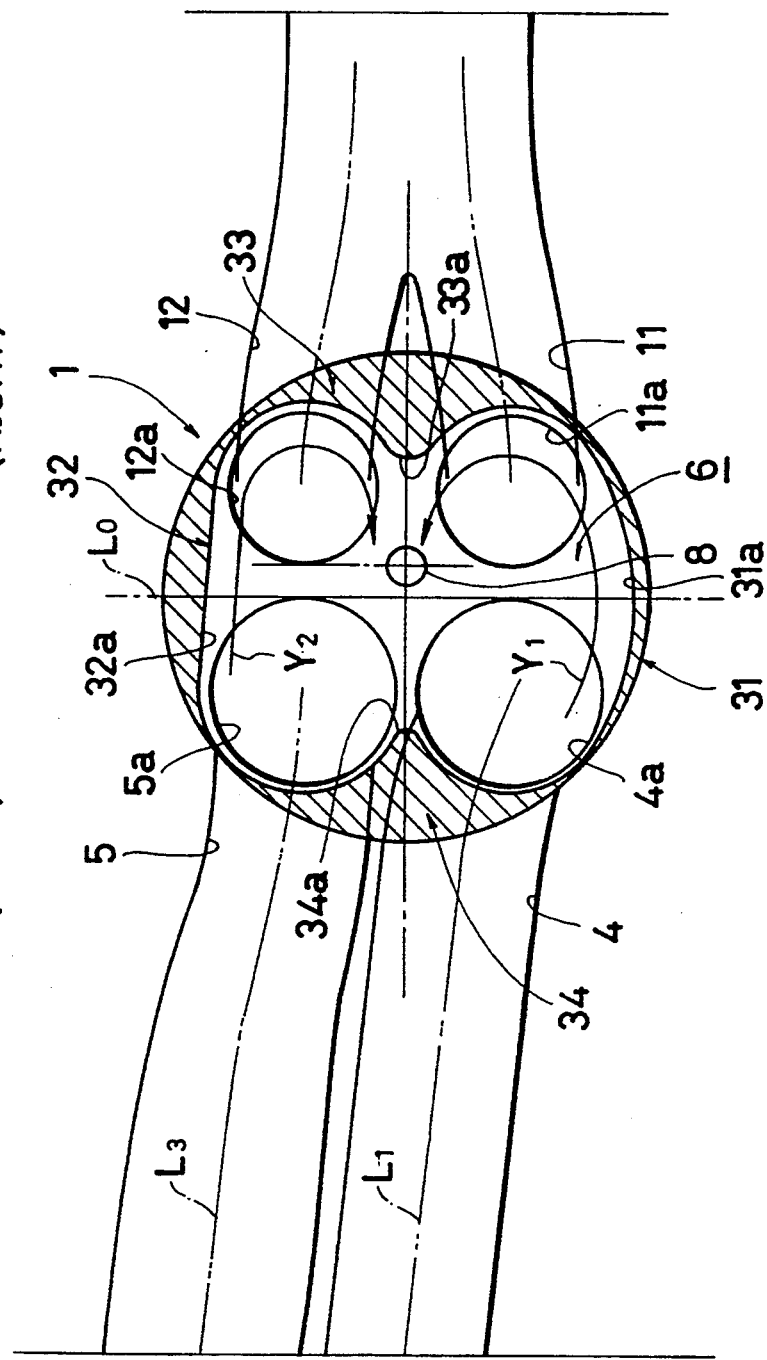

INTAKE SYSTEM FOR ENGINE

BACKGROUND OF THE INVENTION

1. Field of the Invention

The present invention relates to an intake system of an engine.

2. Description of the Prior Art

Generally, the intake gas introduced in the engine becomes less ignitable and Combustive in a lower engine load condition where a smaller amount of the intake gas is introduced into the engine in addition, so-called lean burn engine making the intake gas leaner as the engine load is reduced has been prevailing. In such lean burn engine, the combustibility of the intake gas is further deteriorated.

In view of this, it has been proposed an engine having a primary intake port offset from the center of the cylinder bore and introducing the intake gas throughout entire engine load condition and a secondary intake port opened in intermediate and high engine load conditions.

The intake gas is introduced through only the primary port in the low engine load condition and through both the primary and secondary ports in the intermediate and high engine load condition. These type engines are disclosed in, for example, Japanese Patent Public Disclosure Nos. 59-54732, laid open to the public in 1984, 61-218726, laid open to the public in 1986, Japanese Utility Model Public Disclosure Nos. 61-175541, laid open to the public in 1986 and 61-84135, laid open to the public in 1986. In this type of engine having the primary and secondary ports, intake gas is introduced into the combustion chamber of the engine from the primary port forming a swirl current flowing along circumferential wall of the cylinder when the engine load is relatively low and the secondary port is closed. Thus, this swirl facilitates forming dense intake gas layer around the ignition plug so that the ignition and combustion characteristics of the intake gas are enhanced. In the intermediate and high engine load conditions, the intake gas are introduced into the combustion chamber through both the primary and secondary ports so that the charging efficiency of the intake gas is improved to provide an increased engine output.

In such an engine having both the primary and secondary ports, there occur some situations where it is preferred that the swirl flow is formed in the combustion chamber when both the primary and secondary ports are opened. In the conventional engine, the intake gas flow through the secondary port forms a swirl flow against that of the intake gas through the primary port. In other words, the intake gas from the secondary port flows in the reverse direction of the intake gas from the primary port along the circumferential wall of the cylinder to weaken the swirl flow from the primary port. Therefore, it is difficult to improve the ignition and combustion characteristics once the secondary port is opened to introduce a part of the intake gas. In the engine disclosed in the Japanese Utility Model Public Disclosure No. 61-175541, it is proposed that the primary and secondary ports are oriented in the substantially same direction to reduce the reverse flow from the secondary port against the swirl flow of the primary port. However, this structure is not good enough to produce a desirable swirl flow of the intake gas in the combustion chamber.

SUMMARY OF THE INVENTION

It is therefore an object of the present invention to produce a swirl flow of the intake gas in the engine having a primary and secondary ports.

It is another object of the present invention to improve the combustion and ignition characteristics of the engine taking advantage of the swirl flow.

The above and other object of the present invention can be accomplished by an engine intake system comprising a primary port for introducing intake gas throughout entire engine operating condition, a secondary port provided with a gate valve which is opened in a high engine load condition for introducing the intake gas, a ratio of a tumble flow to a swirl flow is gradually increased as the gate valve is operated from an entirely close condition to a fully open condition. In a preferred embodiment, both axes of the primary and secondary ports are inclined to one side with regard to a camshaft axis in a view along a cylinder bore axis of the engine, the secondary port being disposed in such a manner that the secondary port axis is substantially directed to an ignition plug disposed in a substantially central portion of a cylinder bore of the engine, a primary port curved portion provided adjacent to a port opening located downstream end of the primary port and continued to a combustion chamber of the engine, a secondary port curved portion provided adjacent to a port opening located downstream end of the secondary port and continued to the combustion chamber of the engine, a primary port straight portion extended upstream from the primary port curved portion, a secondary port straight portion extended upstream from the secondary port curved portion, the primary port and secondary port straight portions are provided in a manner that a distance between the primary port axis and secondary port axis is reduced to the downstream thereof in a view along the cylinder axis.

Preferably, a distance between the primary port and secondary port is reduced to the downstream thereof. In another aspect of the invention, the primary port is curved abruptly compared with the secondary port around the downstream end thereof in the view along the cylinder axis.

Typically, the gate Valve is provided with a rotation shaft extending substantially in parallel with the cylinder axis and a valve body for rotating about the shaft so as to control an opening of the secondary port, the valve body rotating in such a manner that a portion of the valve body close to the primary port moves upstream to open the secondary port.

An injection valve is provided in the primary port. In this case, an injection center line of the injection valve crosses a primary port axis to be directed substantially to an ignition plug disposed in the central area of the cylinder bore in the view along the cylinder axis.

An angle between the secondary port axis and a plane perpendicular to the cylinder axis has a relatively large value compared with the primary port so as to facilitate producing a tumble flow in the combustion chamber. A secondary port orientation angle between the secondary port axis at the secondary port opening and a straight line passing through the center of the secondary port opening and the center of a first exhaust port opening facing the primary port opening is provided to have a relatively large value so that intake gas from the secondary port is directed to the central portion of the combustion chamber.

A primary port inclination angle α between an axis of the primary port straight portion and a plane perpendicular to a cylinder axis is provided at a small value compared with the secondary port in a view along a camshaft axis.

The angle α, a primary intake valve inclination angle θ between an axis of a primary intake valve and the cylinder axis, a first exhaust valve inclination angle θ' between an axis of a first exhaust valve facing the primary intake valve and the cylinder axis and a valve body angle β between upper and lower surfaces of the valve body of the primary intake valve satisfy the following condition in a view along the cam shaft axis;

$$\beta > \theta \text{ and } \alpha < \theta'.$$

Preferably, the combustion chamber is of a pentroof and the primary port inclination angle α, the primary intake valve inclination angle θ, a roof inclination angle θ'' between a roof surface of the combustion chamber in the vicinity of an exhaust valve and a plane perpendicular to the cylinder axis and the valve body angle β satisfy the following condition in a view along the camshaft axis;

$$\beta > \theta \text{ and } \alpha < \theta''.$$

In another preferred embodiment, the primary port inclination angle α, the primary intake valve inclination angle θ, the roof inclination angle θ'' and the valve body angle β further satisfy following condition;

$$\alpha < \theta.$$

the primary port axis is curved to a circumferential wall of the combustion chamber in the vicinity of the port opening in a view along the cylinder axis. The primary port is provided with a value seat formed with a through hole which extends along a straight line inclined toward the primary port axis at the primary port straight portion from a tangential line at the primary port opening on the primary port axis by a predetermined angle in a view along the camshaft axis. The primary port is formed with a curved portion in the vicinity of the valve seat, an end point of the curved portion in the primary port axis is located downstream of an upstream end of the valve seat. A curvature R of the primary port axis of a curved portion in the vicinity of the valve seat and a primary port diameter in the curved portion satisfies the following condition;

$$0.9 = R/D = <1.2.$$

Preferably, an end point of a curvature of the primary port axis in a curved portion in which the primary port curves to a circumferential wall of the combustion chamber is located downstream of a start point of a curvature of the primary port axis in the vicinity of the valve seat.

In another aspect of the present invention, control method for controlling engine intake system is provided. The method comprises steps of introducing intake gas through a primary port to form swirl flow in a combustion chamber of the engine in a low engine load condition, introducing the intake gas through a secondary port by opening a gate valve disposed in the secondary port to form a tumble flow as the engine load is increased, and controlling opening of the gate valve in such a manner that a ratio of the tumble flow to the swirl flow is gradually increased as the gate valve is operated from an entirely close condition to a fully open condition.

Further objects, features and advantages of the present invention will become apparent from the Detailed Description of Preferred Embodiments which follows when read in light of the accompanying Figures.

BRIEF DESCRIPTION OF THE DRAWINGS

FIG. 2 is a partly cross sectioned elevational view of a cylinder of the engine;

FIG. 3 is a plan view around the cylinder;

FIG. 10 is a partly cross sectioned plan view around the cylinder together with mask configuration;

DETAILED DESCRIPTION OF THE PREFERRED EMBODIMENTS

Figure 1A:
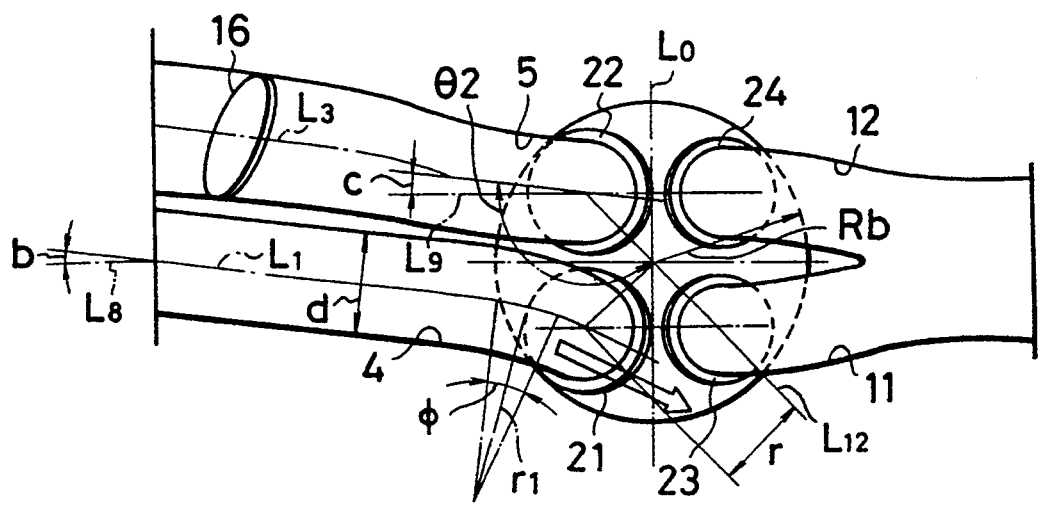
FIGS. 1(A) and 1(B) show plan view and elevational cross sectional view of engine provided with intake system in accordance with the present invention.

Hereinafter, a preferred embodiment of the present invention will be explained.

Referring to FIGS. 1 through 4, each cylinder of engine E is provided with a first and second intake valves 2, 3 which open and close a first or primary and second or secondary intake port 4, 5. When the ports 4, 5 are opened, an intake gas is introduced into a combustion chamber 6. The intake gas is compressed and thereafter ignited by the ignition plug 8 to combust. The engine E is also provided with a first and second exhaust valves 9 and 10 which open and close a first and second exhaust ports 11 and 12. When the exhaust ports 11, 12 are opened, exhaust gas is scavenged from the combustion chamber 6.

An injection valve 5 is disposed for injecting the fuel into the primary port 4. In the secondary port 5 is provided a secondary port gate valve (S valve) 16 which opens and closes the secondary port 5 in accordance with the amount of the intake gas or engine load. The primary port 4 and secondary port 5 are formed with port openings 4a and 4b to the combustion chamber 6 on which valve seats 21 and 22 are disposed. The first and second exhaust ports 11 and 12 are also provided with valve seats 23 and 24 at port openings to the combustion chamber 6.

Thus, a roof surface of the combustion chamber 6 is formed with the openings 4a and 5a of the intake ports 4 and 5 and openings 11a and 12a of the exhaust ports 11 and 12. The openings 4a and 5a are included in intake side (left side in the drawing) semicircle of the cylinder while the openings 11a and 12a are included in exhaust side (right side in the drawing) semicircle of the cylinder.

The ignition plug 8 is included in the exhaust side semicircle close to the center of the cylinder. The intake gas flow from the primary port 4 produces a swirl flow which flows circumferentially in a substantially horizontal plane along a circumferential wall of the combustion chamber 6 cylinder. On the other hand, intake gas flow from the secondary port 5 produces a tumble flow which flows in a direction of a piston stroke in the combustion chamber 6.

Figure 1B:
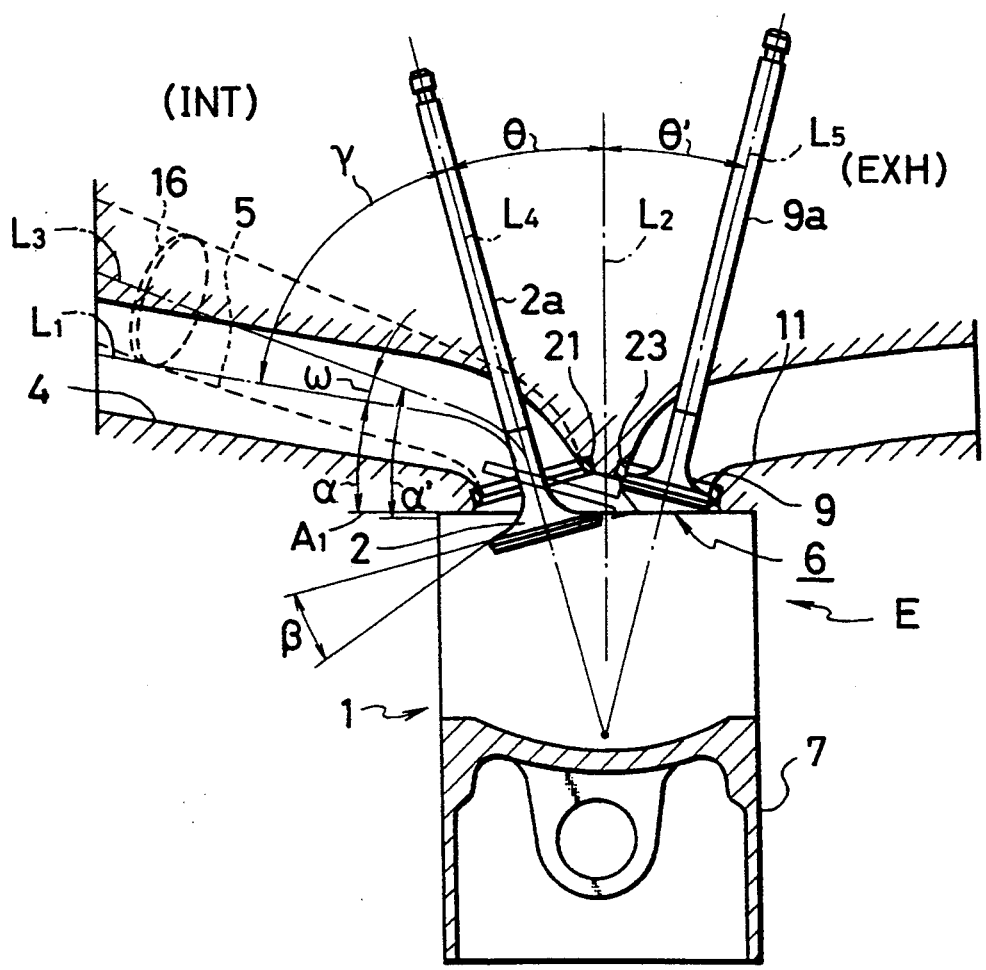

FIG. 1(B) and FIG. 2 show sectional views taken by a plane perpendicular to an axis L0 (see FIG. 3) of cam shaft for the intake and i exhaust valves. As shown FIGS. 1(B) and 2, the primary port 4 is formed with a straight portion 4b which extends along a substantially straight line at an upstream portion thereof and with a curved portion between the straight portion 4b and the opening 4a. Likewise, the secondary port 5 is formed with a straight portion 5b and a curved portion 5c. The straight portion 4b of the primary port 4 is inclined to have an angle $\alpha$ between an axis L1 of the straight portion 4b and a plane A1 (cylinder cross section) perpendicular to an axis L2 of cylinder bore. The straight portion 5b is inclined to have an angle $\alpha'$ and the plane A1.

The first intake valve 2 is provided with a valve stem 2a and valve body 2b. An axis L4 of the valve stem 2a is inclined at an angle $\theta$ (intake valve angle) with the cylinder bore axis L2. A lower Surface of the valve body 2b is in substantially parallel with the roof surface of the combustion chamber 6. The upper and lower surfaces of the valve body crosses at an angle $\beta$. The first exhaust valve 9 is provided with valve stem 9a and valve body 9b. An axis L5 of the valve stem 9a crosses the cylinder bore axis L5 to have an angle $\theta'$. The lower surface of the valve body 9b is in substantially parallel with the roof surface (pent roof) of the combustion chamber 6. An angle $\Gamma$ between the primary straight portion axis L1 and the first valve stem axis L4 is called a port incident angle and a value $\alpha'- \alpha$ is called a port angle difference w.

Figure 5:
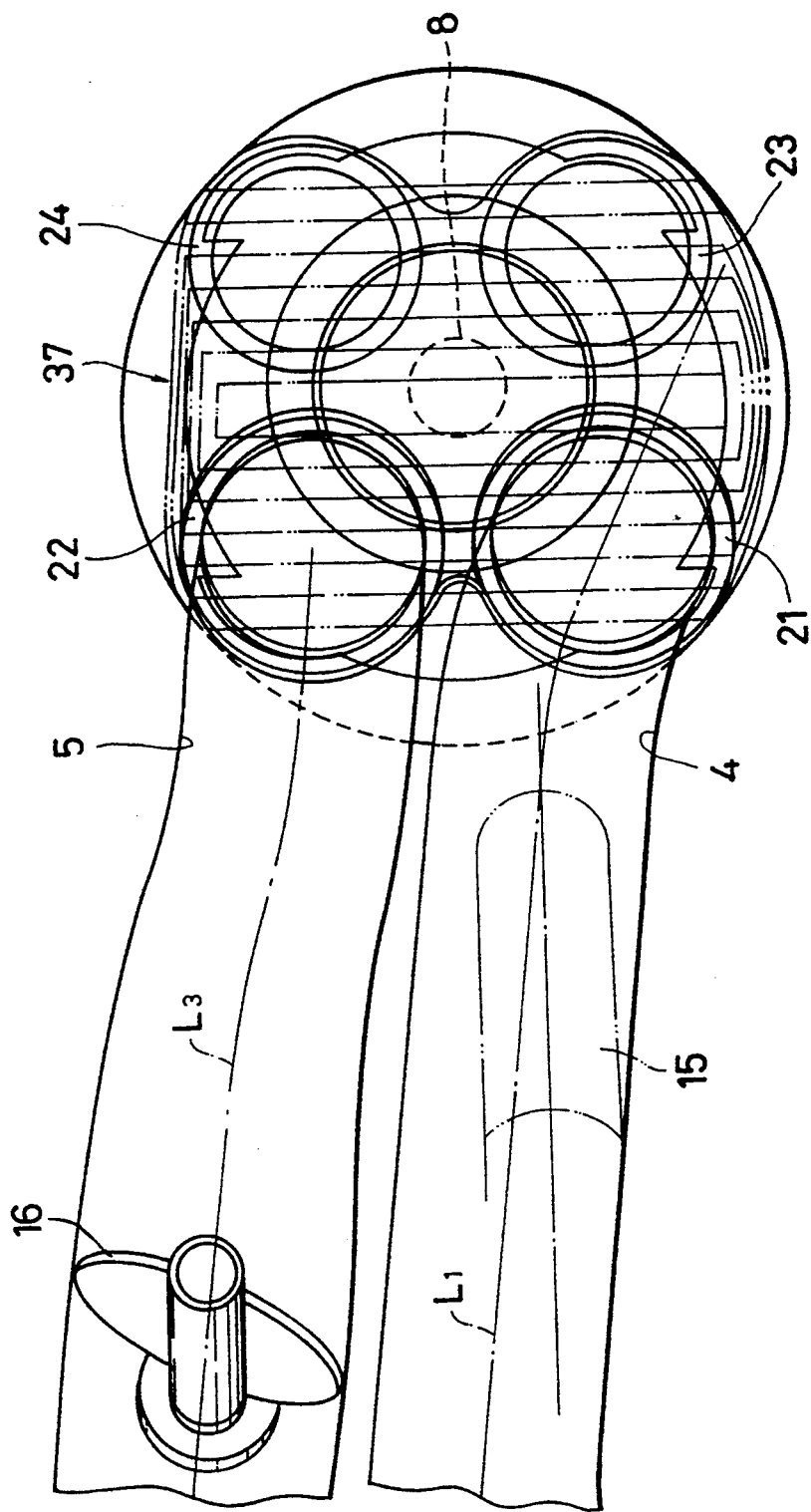
FIG. 5 is a plan view around the cylinder together with roof configuration of the combustion chamber.
Figure 6:
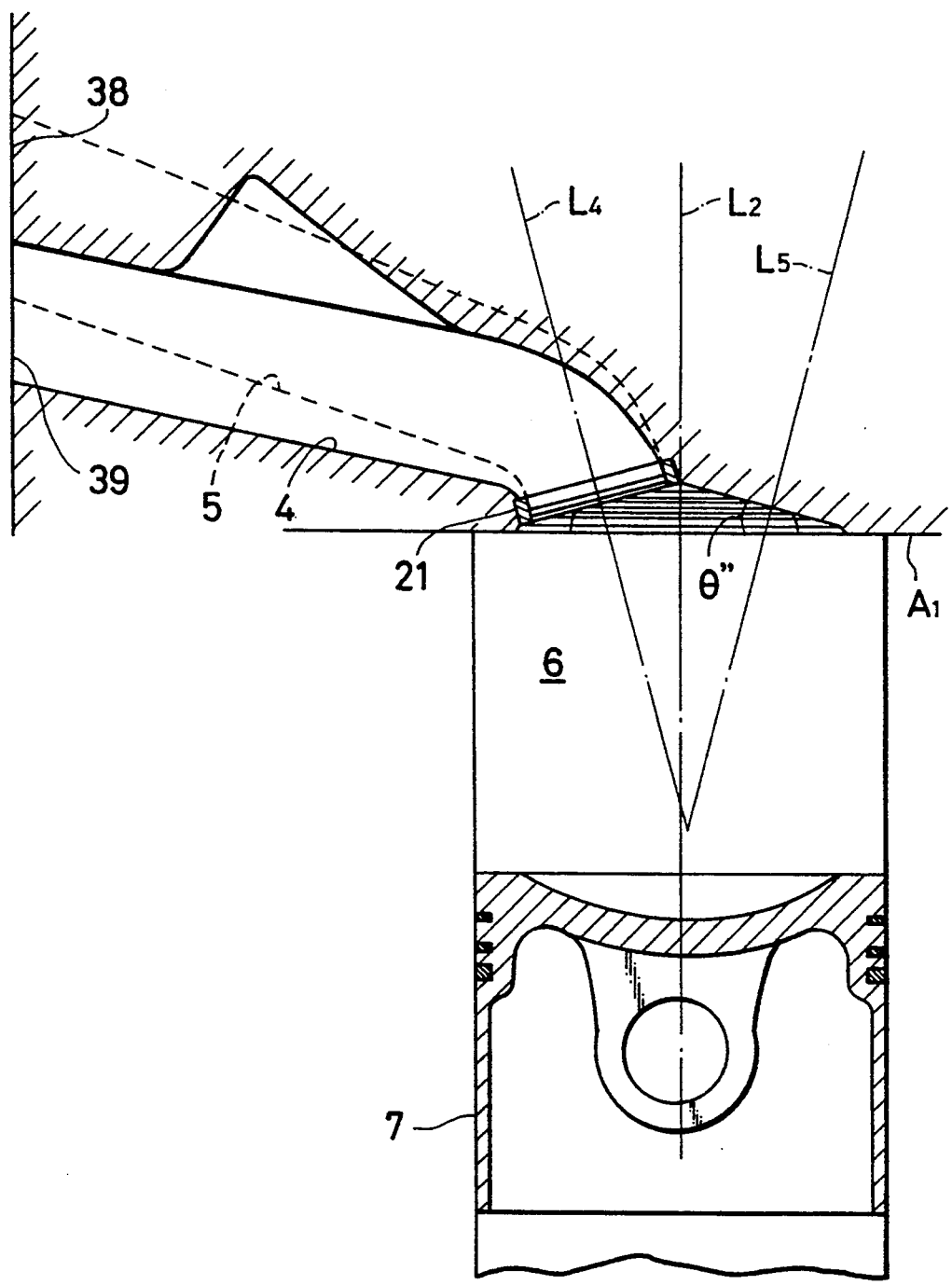
FIG. 6 is a partly cross sectioned elevational view of the cylinder.

As shown in FIG. 5 and 6, the combustion chamber is of a pent roof. The roof surface 37 of the combustion chamber 6 is inclined with regard to the cylinder cross section A1 to have an angle $\theta''$. In FIG. 5, the configuration of the roof surface 37 is shown by means of the contour lines. The lower surface of the valve body 9b of the first exhaust valve 9 crosses the cylinder cross section A1 with an angle $\theta''$. Thus, the angle $\theta'$ is equal to the angle $\theta''$ since the valve stem axis crosses the roof surface 27 at a right angle. With such a pent roof combustion chamber, the angle $\theta''$ between the cylinder cross section plane A1 and the roof surface 37 in the exhaust side is relatively small as well as that angle in the intake side. Thus, the valve stems of the intake valves 2 and 3 and exhaust valves 9 and 10 take rather upright attitude.

The above angles $\alpha, \theta, \theta', (\theta'')$ and $\beta$ have a following relationship.

$$\beta > \theta \qquad \text{Formula (1)}$$

$$\alpha < \theta'(\theta'') \qquad \text{Formula (2)}$$

$$\alpha = < \theta \qquad \text{Formula (3)}$$

Figure 19A:
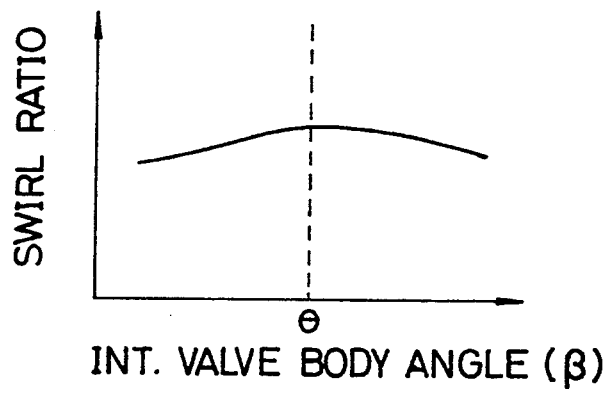
FIG. 19(A) is a graphical representation of a characteristic of the swirl ratio versus the valve body angle.
Figure 19B:
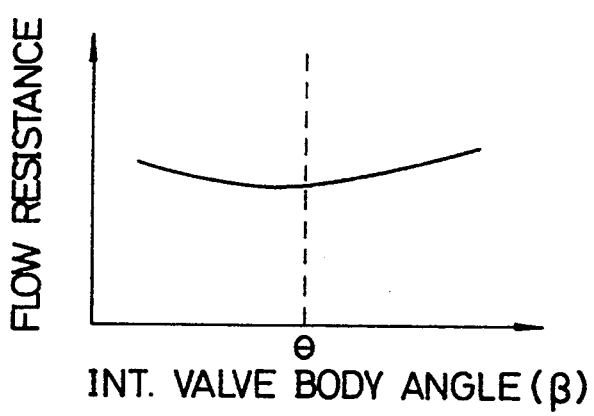
FIG. 19(B) is a graphical representation of a characteristic of the flow resistance versus the valve body angle.

The reason of $\beta > \theta$ is the following. When the value $\beta$ is not greater than the value $\theta$, the intake gas flowing into the combustion chamber 6 through the primary port 4 hits the upper surface of the valve body 2b to be curved and a part of the intake gas hits the roof surface 37 of the combustion chamber to produce a turbulence. As a result, a flow speed of the intake gas as introduced into the chamber 6 is reduced to prevent a strong swirl from being produced. However, it is not good to provide the angle $\beta$ with too much value. As the angle $\beta$ is increased, the space defined between the primary port 4 and the valve body 2b or a flow path of the intake gas is reduced to increase the flow resistance. Relationships between the value $\beta$ and swirl ratio and the flow resistance are shown in FIGS. 19 (A) and 19(B). The swirl ratio is defined as follows.

$$RS = wc/we \qquad \text{formula (4)}$$

Wherein
RS; swirl ratio
wc; swirl speed in the end of the intake stroke (BDC)
we; crank shaft angular speed The swirl ratio RS is understood as a swirl speed per a unit crank angle. As the engine speed is increased, the amount of the intake gas charged in the combustion chamber 6 is increased and thus swirl strength is enhanced. As the engine speed is increased, the crank shaft angular speed is also increased so that the swirl ratio is reduced in spite of the increase of the engine speed.

The reason of $\alpha < \theta' (=\theta'')$ and $\alpha = < \theta$ is the following. In order to facilitate the production of the swirl of the intake gas; the angle $\alpha$ is provided as small as possible so that a horizontal speed component (speed component in the direction along the cylinder cross section plane A1) of the intake gas flowing into the chamber 6 is enhanced.

Thus, when conditions of formulas (1), (2) and (3) are satisfied, the intake gas through the primary port 4 can be smoothly introduced into the combustion chamber 6 without hitting the roof surface 37 of the combustion chamber 6 as the piston strokes downward. Thus, the horizontal speed component of the intake gas is enhanced to facilitate producing the swirl flow in the combustion chamber 6.

On the other hand, the inclination angle α of the secondary port 5 has a large value compared with that of the primary port 4. Thus, the intake gas through the secondary port 5 has a relatively large downward speed component to produce so called a tumble flow or a vertical vortex. This tumble flow suppresses the engine knocking and heat loss because the tumble flow is introducing toward the center of the combustion chamber 6 rather than hitting the circumferential wall which transfers to disperse the heat produced by the combustion of the intake gas. In the intermediate and high engine load conditions as the secondary port gate valve (S-valve) is opened, it is a tendency that the engine knocking occurs. In the illustrated embodiment, the tumble flow produced by the intake gas through the secondary port 5 effectively prevents the knocking from occurring and suppressing heat loss.

The strength of the tumble flow can be indicated by the tumble ratio RT defined by the flowing formula.

$$RT = wc'/we \qquad \text{formula (5)}$$

Wherein
$wc'$; tumble flow speed at the end of the intake stroke (BDC),
$we$; crank shaft angular speed.

Figure 7:
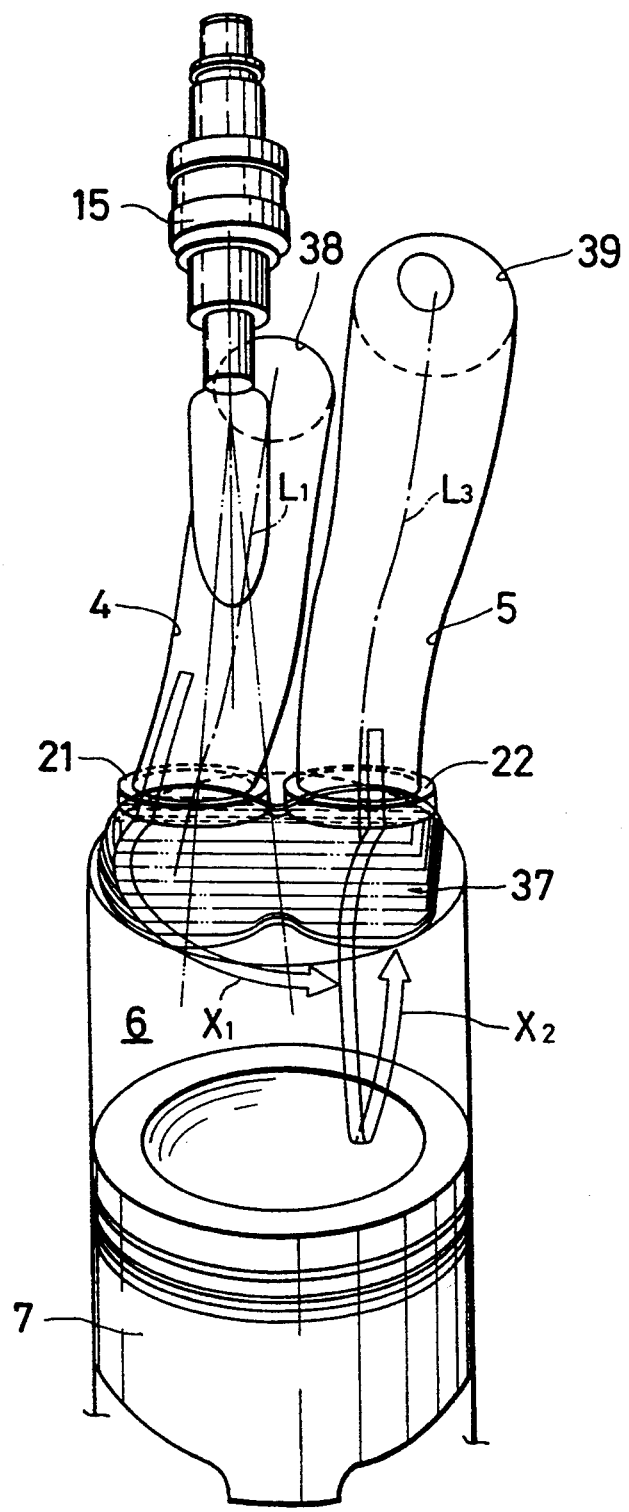
FIG. 7 is a perspective view of the cylinder.

Thus, as shown in FIG. 7, a swirl flow shown by an arrow X1 and a tumble flow shown by an arrow X2 are produced in the combustion chamber 6.

Figure 16:
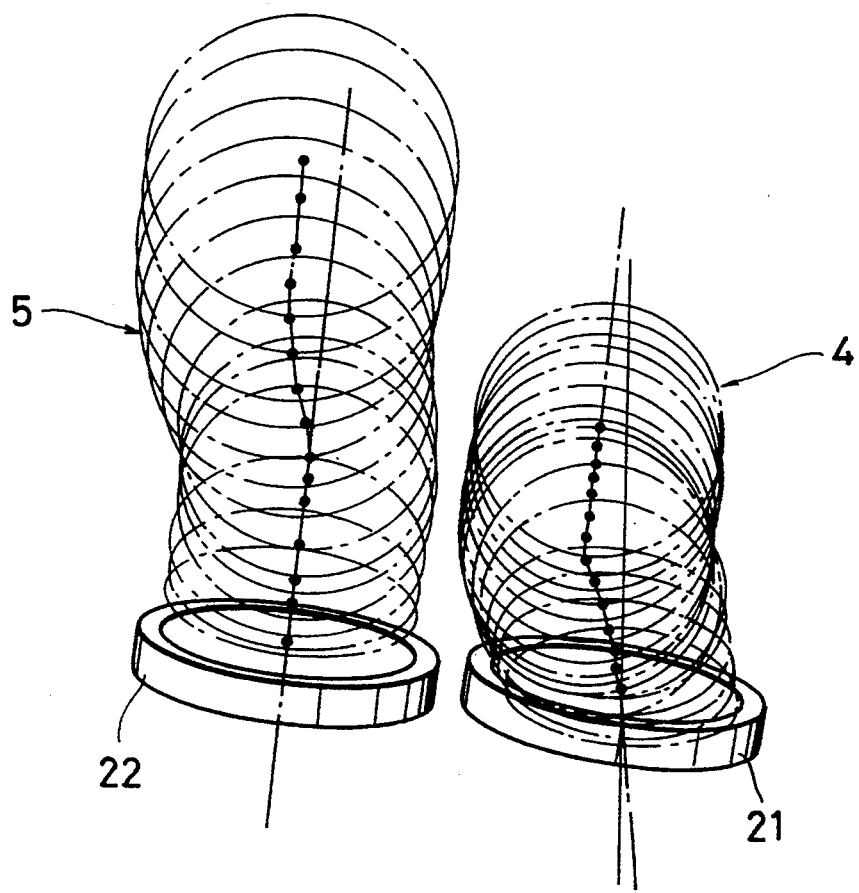
FIG. 16 is a perspective view showing a curvature and cross sectioned configuration of the primary and secondary ports.

As shown in FIGS. 1(A), (3) and 4, on a plane perpendicular to the cylinder bore axis L2 (see FIG. 2), the primary port straight portion 4b is provided in a manner that an angle between the axis L1 thereof and a straight line L8 perpendicular to the cam shaft axis L0 is a predetermined value b. The secondary port straight portion 5b is provided that an angle between the axis L3 of the secondary port straight portion 5b and a straight line L9 perpendicular to the cam shaft axis L0 is a predetermined value c (b<c). The primary and second ports 4 and 5 are provided to be inclined to the same side with regard to the cam shaft axis L0. The straight portions 4b and 5b are provided in a manner that a distance between the primary port axis L1 and secondary port axis L3 is reduced to the downstream thereof. The distance or partition between the primary and secondary ports 4 and 5 is reduced to the downstream (for example t1>t2 as shown in FIG. 3). The change in the distance or thickness of the partition between ports 4, 5 is shown in FIG. 16 by three-dimensional view.

The opening 4a of the primary port 4 is oriented to the circumferential wall surface of the cylinder 1 while the opening 5a of the secondary port 5 is oriented to the central portion of the cylinder 1. Thus, the swirl flow is produced mainly by virtue of the above unique structure of the primary port 4 and the tumble flow is produced mainly by virtue of the structure of the secondary port 5. In this case, the intake gas from the secondary port 5 does not produce a swirl flow against the swirl flow through the primary port 4 because both the primary and secondary ports 4 and 5 are oriented to introduce the intake gas into the combustion chamber 4 in the substantially same direction.

Figure 19C:
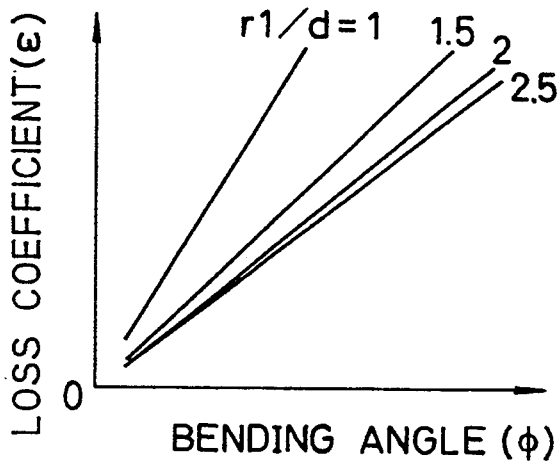
FIG. 19(C) is a graphical representation of characteristic of loss coefficient versus bending angle.

Diameter of the curved portion 4c of the primary port 4 is provided at a predetermined value d in a plan view. The curved portion 4c is provided to be continuous from the end of the straight portion 4b of the port 4. The curved portion 4c which is oriented substantially to the center of the cylinder bore at a starting point is extended to be curved away from the center and toward the circumferential wall of the cylinder bore with a bending angle φ and curvature radius r1. Thus, the opening 4a of the port 4 is opened toward the circumferential wall so that the intake gas flowing into the combustion chamber 6 through the primary port 4 produces a strong swirl flow. However, the curved portion 4c increases the flow resistance. The flow resistance E is determined in relation with the values d, φ and r1. In FIG. 19(C), there is shown a relationship between the flow resistance E, the port diameter d, the bending angle φ and the curvature radius r1. As the bending angle φ is increased, the resistance E is increased. Conversely, as the curvature radius r1 is increased, the resistance E is reduced. It is preferred that the curvature radius r1 is set as large as possible and the bending angle φ is as small as possible in order to reduce the flow resistance E. It should however be noted that a smaller bending angle φ makes the primary port 4 difficult to divert toward the circumferential wall of the cylinder bore and that it is difficult to produce a strong swirl. Thus, the values of the port diameter d, the curvature radius r1 and the bending angle φ must be determined to provide as strong swirl as possible with an allowable flow resistance. A value r1/d is preferred to be from approximately 1.5 to 2.0.

Figure 4:
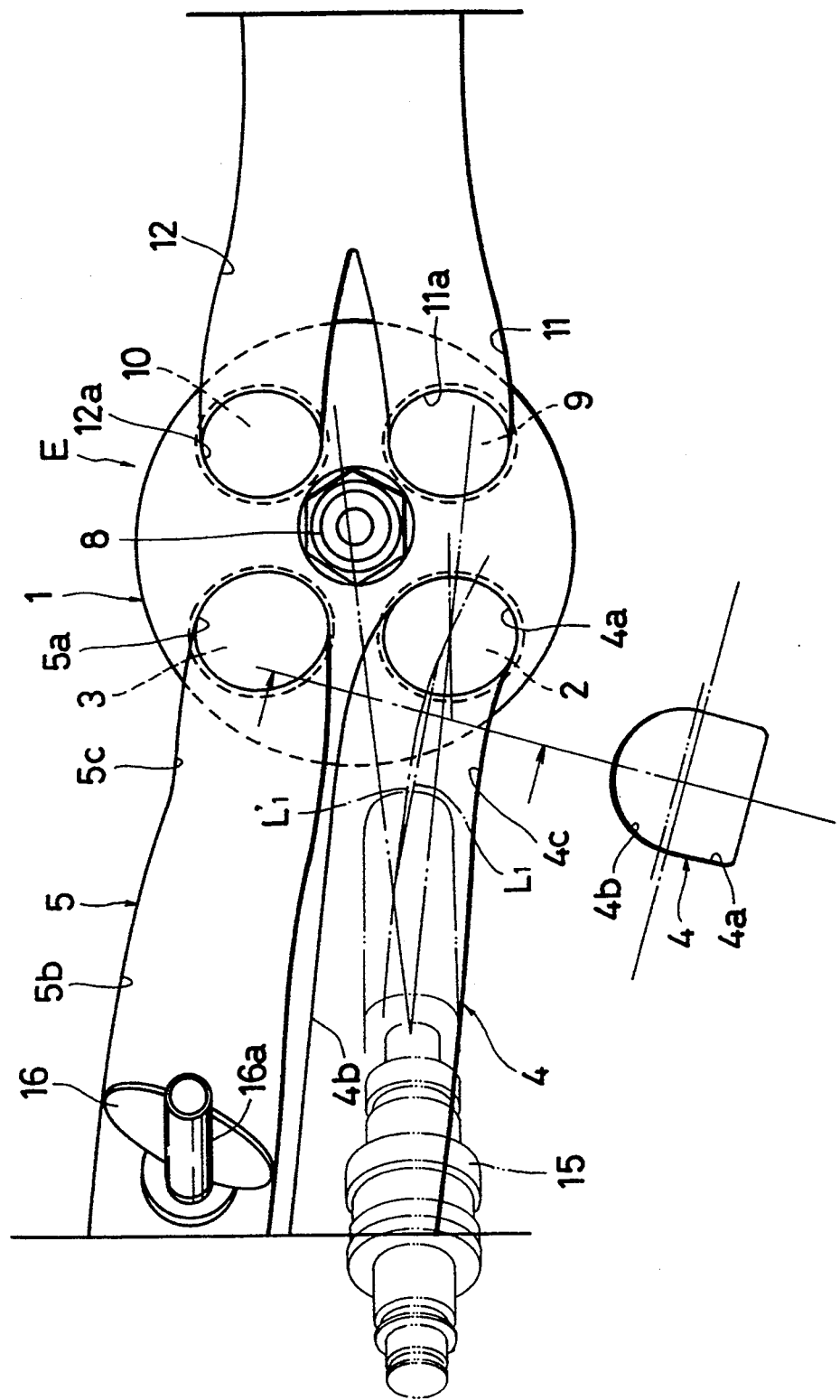
FIG. 4 is a plan view around the cylinder together with a cross sectioned intake port.

The cross section of the primary port 4 is of a circular configuration in the upstream portion (substantially in the straight portion). As shown in FIG. 4, the cross section of the primary port 4 around the curved portion 4c is of a semicircular contour on the half portion facing the secondary port and of a rectangular configuration at the opposite half side.

In other words, the cross section of the primary port 4 is not symmetrical around the curved portion 4c. As a result, the center of the cross section of the primary port 4 or a center of the intake gas flow in the port 4 is offset toward an outer side or the opposite side of secondary port 5 in comparison with the circular configuration. In FIG. 4, the hypothetical axis L'1 of the port 4 as a circular configuration is shown. Thus, the intake gas is introduced into the combustion chamber 6 with a flow center offset to the outer side to facilitate producing a strong swirl. A secondary port orientation angle θ2 between the secondary port axis L3 at the opening 5a and a straight line L12 passing through the center of the secondary port opening 5a and the center of the first exhaust port opening 12a is provided to have a predetermined value. Where the value of the secondary port orientation angle θ2 is small, the secondary port opening 5a is directed to the circumferential wall in the opposite direction to the primary port opening 4a to produce a reverse swirl flow against the swirl flow from the primary port 4. Thus, the value of the secondary port orientation angle θ2 is determined so as to suppress the reverse swirl as small as possible.

Figure 17:
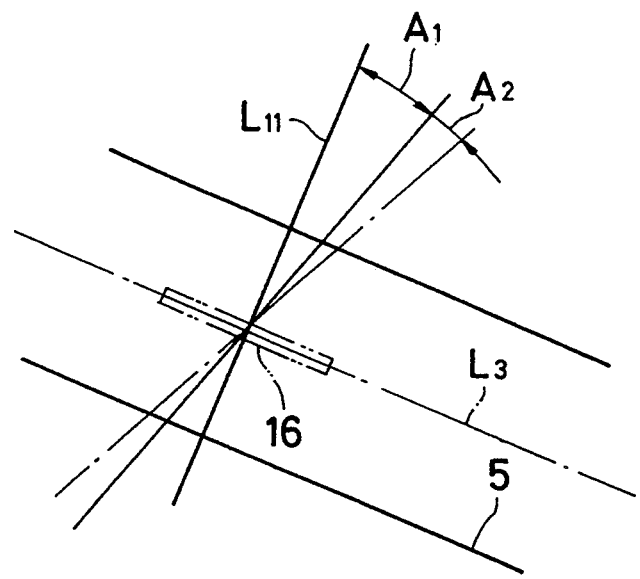
FIG. 17 is a simulation view showing the S-valve operation.
Figure 20A:
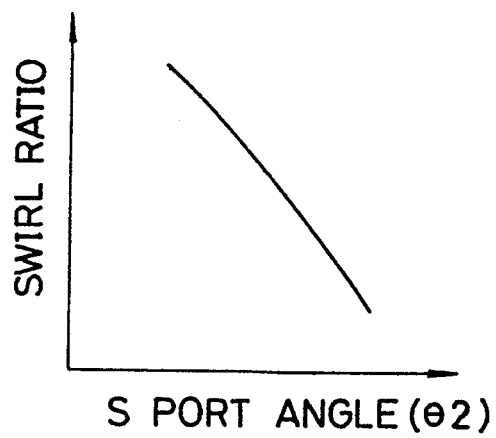
FIG. 20(A) is a graphical representation of characteristic of the swirl ratio versus port inclination angle.
Figure 20B:
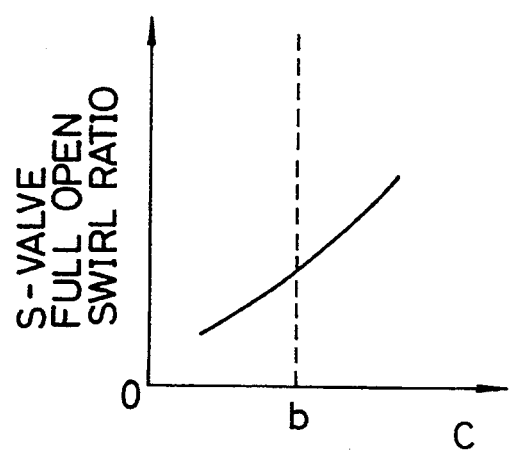
FIG. 20(B) and (C) are graphical representation of characteristics of the swirl ratios at the full open condition of the S-valve versus angles c and w respectively.
Figure 20C:
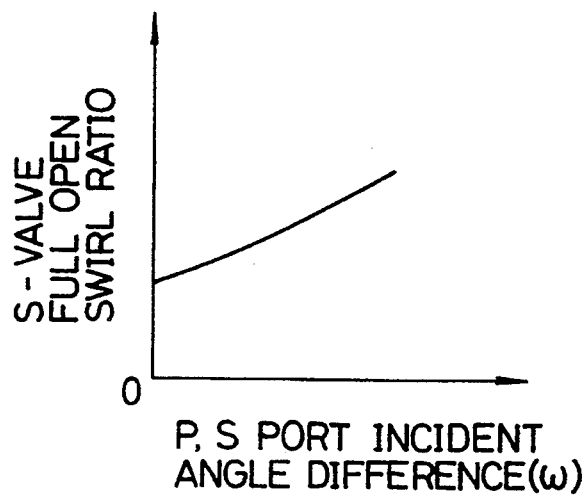

A relationship between the reverse swirl ratio and the port orientation angle θ2 is shown in FIG. 20(A). S-valve 16 has a rotation shaft 16a extending in substantial parallel with the cylinder bore axis L2 as shown in FIG. 4. The S-valve 16 rotates about the shaft 16a to open and close the secondary port 5. When S-valve 16 is opened, it is rotated in a manner that a primary side portion of a valve body is moved upstream and the other side portion thereof is moved downward. As shown in FIG. 17, the S-valve 16 is fully opened when the valve body thereof is aligned with the secondary port axis L3. When the valve 16 is rotated to a position to have a predetermined angle A1 (for example 20 degree) with a straight line L11 crossing the line L3 at a right angle, the S-valve 16 is fully closed. However, the S-valve 16 is prevented from being moved to a closing direction beyond a position A2 where the valve 16 is rotated to a opening direction from the positional by a predetermined angle (for example 5–8 degree). Therefore, in a low engine load condition, the S-valve 16 is kept slightly opened to introduce a part of the intake gas into the combustion engine from the secondary port 5. As a result, residual exhaust gas remaining in the combustion chamber 6 is prevented from flowing back to the secondary port 5. The intake gas from the secondary port 5 is effected to scavenge the residual exhaust gas in the combustion chamber 6 and to reduce a pumping loss of the engine.

Figure 21:
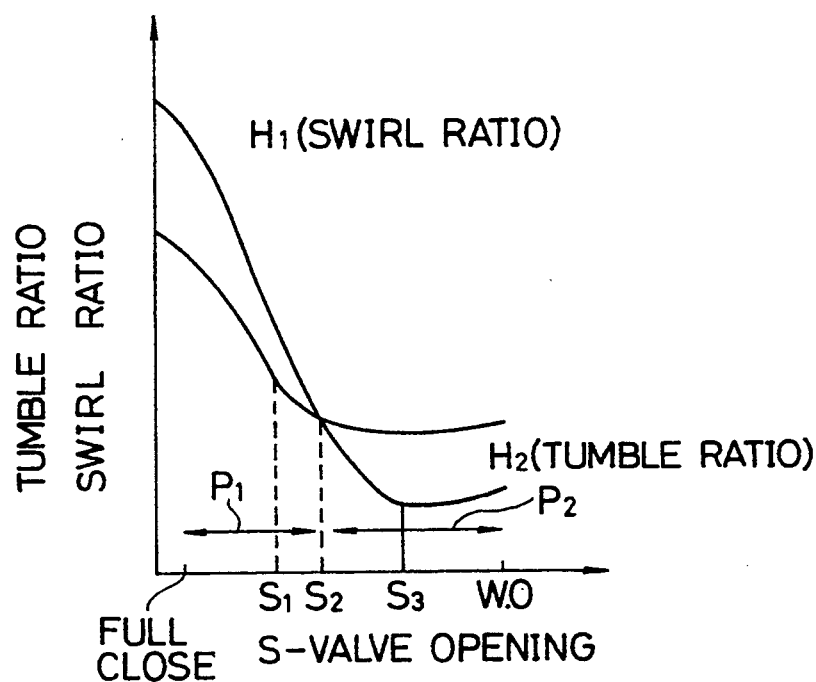
FIG. 21 is a graphical representation of a characteristic of the swirl ratio and tumble ratio versus S-valve opening.

As the opening of the S-valve 16 is changed, the swirl ratio RS and tumble ratio RT are changed. In FIG. 21, relationships between opening of the S-valve and swirl ratio RS and tumble ratio RT are shown. The property lines H1, H2 show the swirl ratio RS and tumble ratio RT. Even when the S-valve 16 is substantially closed, the tumble flow is produced by virtue to the downward stroke of the piston.

As seen from FIG. 21, in a range P1 where the opening of the S-valve 16 is not greater than a position S2, a swirl flow from the port 4 is stronger than the tumble flow from the port 5. On the other hand, in a range P2 where the opening of the S-valve 16 is greater than a position S2, the swirl flow from the primary port 4 is weakened and the tumble flow from the secondary port 5 is enhanced because of the increase of the intake gas therethrough. In FIG. 21, when the opening of the S-valve 16 is increased, the reduction rate of the tumble ratio RT is rapidly lowered around a point S1. The reduction rate of the swirl ratio RS is rapidly lowered around a point S3 (S3>S1). It will be understood that the swirl flow exists in not only low engine load or speed condition but also high engine load or speed condition. This is because the port inclination angle $\alpha$, valve inclination angles $\theta$, $\theta'$, $\theta''$, valve body angle $\beta$, angles a, b and c, values t1, t2 and angle $\phi$ are provided appropriately. Thus, even in the high engine load condition, the strong swirl is produced.

Therefore, when the S-valve is fully opened, the strong tumble flow is produced to improve anti-knocking characteristic and the like. From the condition where the S-valve 16 is closed to a condition where the S-valve 16 takes the opening S3, the swirl flow exists effectively to facilitate so called laminate introduction or less turbulence flow of the intake gas to improve the combustion characteristic. As a result, lean intake gas mixture burning can be accomplished although the heat loss is increased as the swirl flow is enhanced. However, in the illustrated embodiment, the tumble flow exists as well as the swirl flow so that the heat loss is suppressed as low as possible.

Figure 18:
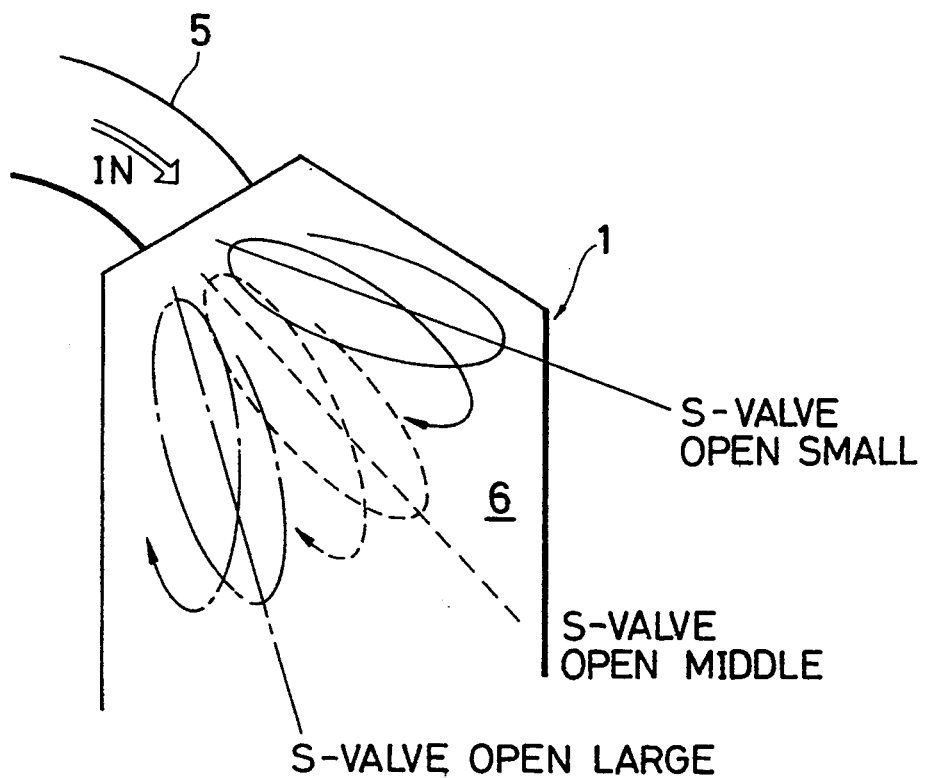
FIG. 18 is a simulation view showing the production of the swirl.

In short, the condition of S3>S1 means that a swirl flow prevailing condition is switched gradually to a tumble flow prevailing condition from the low engine load and low engine speed condition as shown in FIG. 18. As a result, the combustion characteristic of the engine can be improved in the intermediate or high engine load condition because of the laminate introduction.

Figure 8:
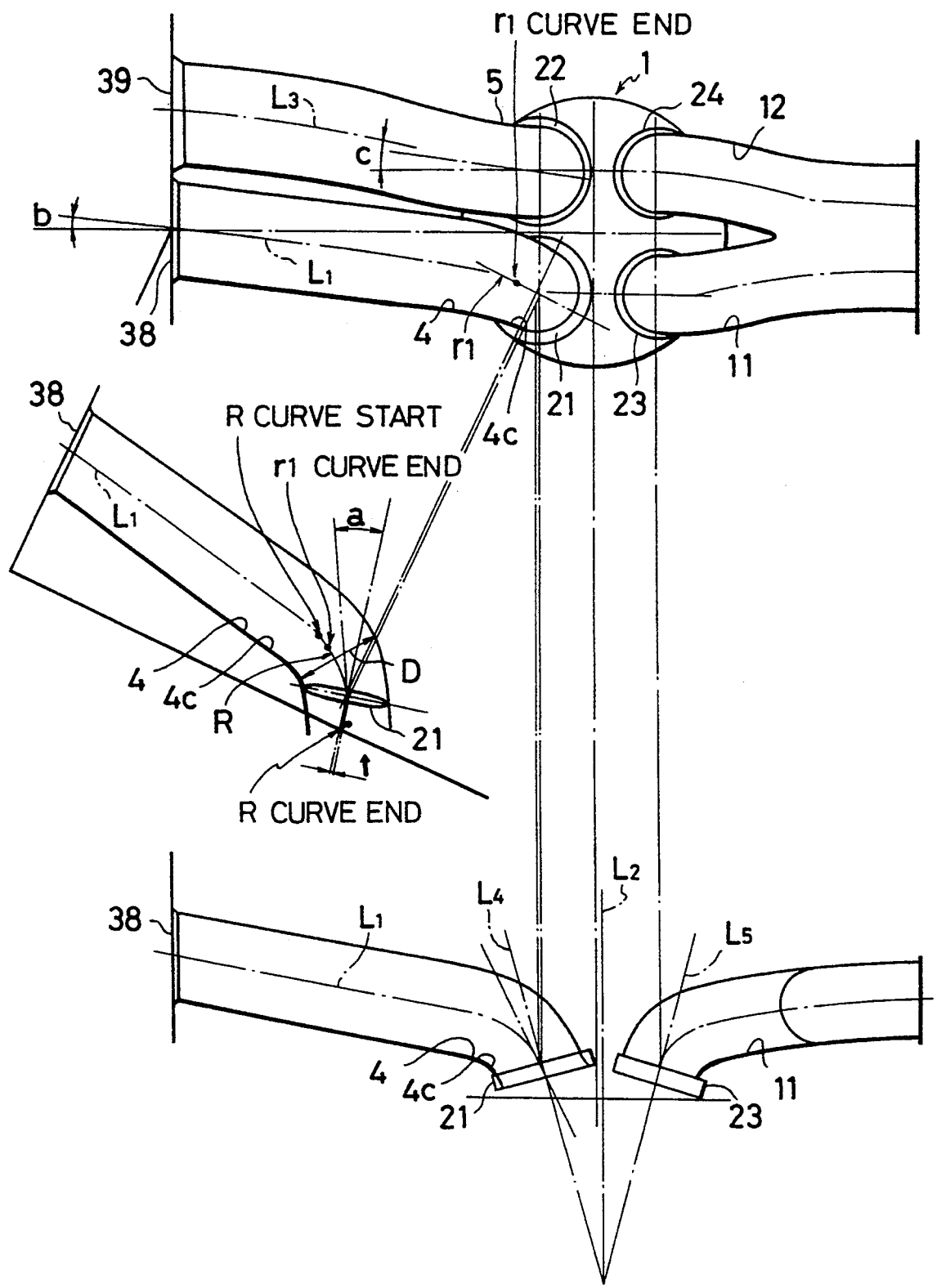
FIG. 8 is a view showing a port configuration and layout thereof.
Figure 9:
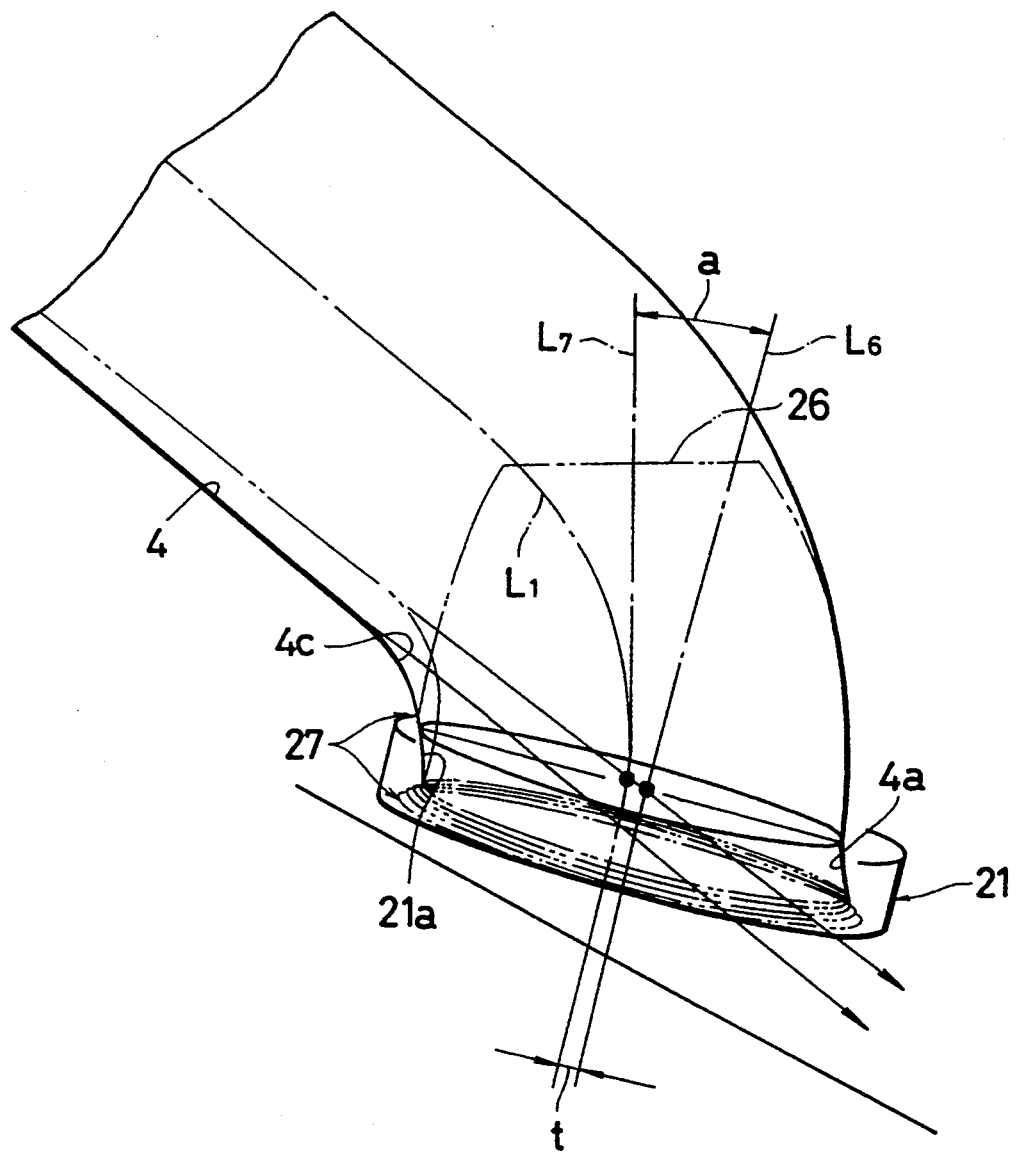
FIG. 9 is an elevational view around the primary port opening.
Figure 11A:
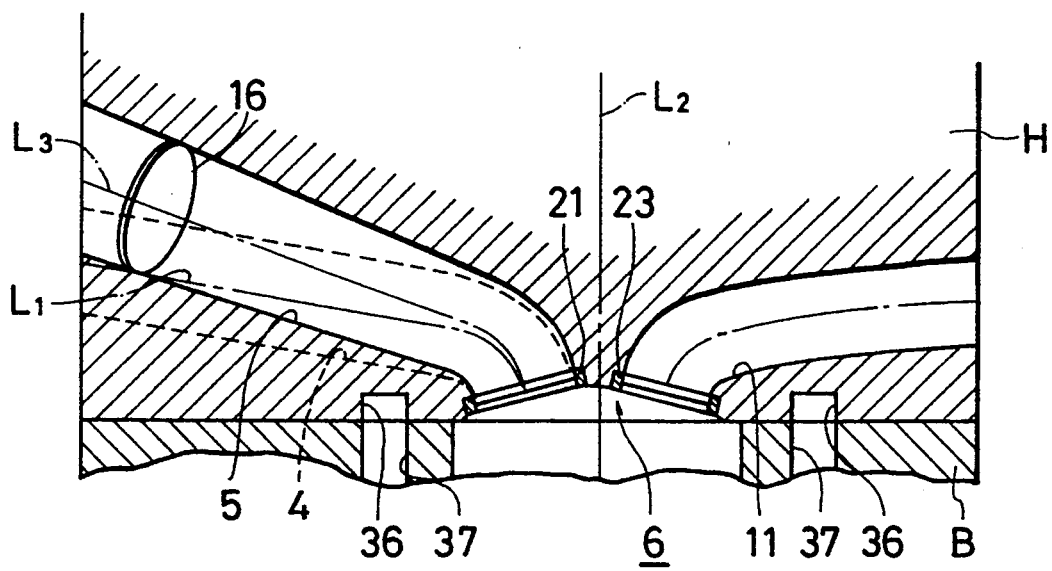
FIGS. 11(A) and 11(B) are plan view and elevational view around the cylinder respectively.
Figure 11B:
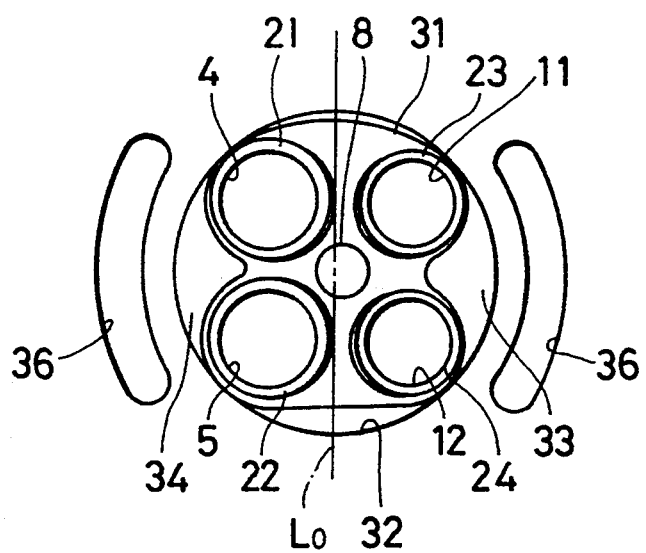

The swirl strength is changed in accordance with the angle c between the secondary port axis L3 and the line L9 and the port angle difference w. Characteristics of the swirl strength to the angles c and w are shown in FIGS. (B) and (C). As shown in FIGS. 8 and 9, as seen from a cam shaft direction or a straight line passing through the centers of the primary and secondary port openings 4a and 5a, the curvature R of the curved portion 4c have a relatively large value with regard to the diameter D of the port.

That is, the end of the curvature of the port axis in the curved portion 4c is located downstream of an upstream end of the valve seat 21 to have a large curvature R. In the conventional intake structure, generally, a straight portion having a straight axis is formed continuously downstream of the end of the curved portion having a curved axis. Thus, the curvature R of the curved portion cannot be increased.

Figure 22:
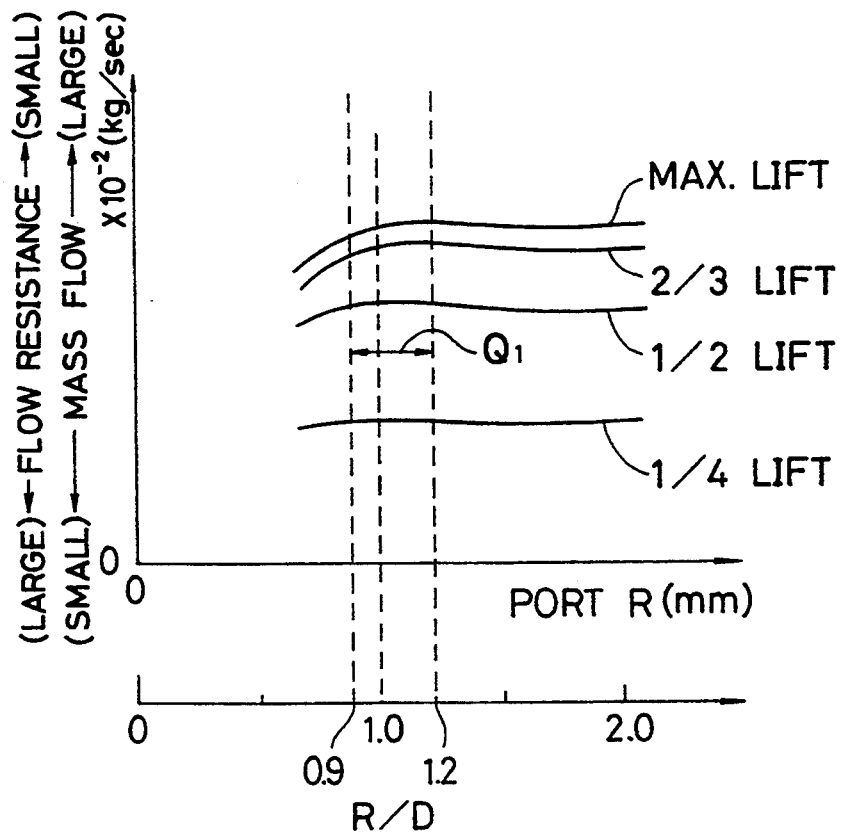
FIG. 22 is a graphical representation of a characteristic of the mass flow of the intake air (flow resistance) versus R/D(port curvature/port diameter).

In the illustrated embodiment, the R/D is set at 1.0. Preferably, the R/D is selected within a range of 0.9 to 1.2 which is shown by a zone Q1 in FIG. 22. Generally, the flow resistance is critical when an intake valve lift is increased beyond $\frac{2}{3}$. It will be understood from FIG. 22 that when the valve lift is increased beyond $\frac{2}{3}$, the flow resistance is increased when the value of R/V is smaller than 0.9 and is substantially constant when the value of R/V is greater than 1.2.

The end point of the curvature r1 of the port axis of the curved portion 4c seen from a direction of the cylinder axis is located downstream of the start point of the curvature R of the port axis of the curved portion seen from the direction of the cam shaft axis.

Thus, the flow resistance in the curved portion 4c is reduced to increase the intake gas speed flowing into the combustion chamber 6 so that the production of the swirl is facilitated. As a result, the charging efficiency can be enhanced. Meanwhile, the primary port 4 and secondary port 5 are connected with an intake manifold through upstream openings 38 and 39.

A substantially cylindrical valve seat 21 is disposed on the primary port opening 4a. The valve seat 21 is formed with a through hole 21a for flowing air. The hole 21a is formed by a machining tool 26 as extended along a line L7 having an angle a with a tangential line L6 of the primary port axis L1 at the opening 4a. Through this machining process, the primary port is also subjected to the machining treatment to establish a continuous connection between the through hole 21a and the primary port 4. The valve seat 21 is formed with an edge portion 27. A distance t is an offset of the line L6 on a plane including upper edge of the valve seat. Thus, the hole 21a has an inclination so that the horizontal component of the intake air flowing into the combustion chamber 6 from the primary port 4 is increased to enhance the swirl flow. The inner wall of the primary port 4 is connected smoothly with the inner surface of the valve seat 21a so as to reduce the flow resistance.

In FIG. 10, as seen from a direction along the cylinder axis L2, a swirl assist mask 31 is provided between the primary port opening 4a and the first exhaust port opening 11a. A tumble assist mask 32 is provided between the secondary port opening 5a and the second exhaust port opening 12a. A swirl break mask 33 is provided between the first exhaust port opening 11a and second exhaust port opening 12a. Further, a tumble swirl facilitating mask 34 is provided between the primary port opening 4a and secondary port opening 5a. The swirl assist mask 31 is formed with an inner edge of a substantially circular arc extending along the circumferential surface 1 to facilitate the production of the swirl flow. The tumble assist mask 32 is formed with a substantially straight inner edge extending in substantial parallel with the secondary port axis L3 to facilitate the production of the tumble flow of the intake gas flowing through the secondary port 5. The swirl break mask 33 is provided with an inner edge 33a extending along edge lines of the first and second exhaust openings 11a and 12a around them and projecting to the center of the cylinder 1 between the openings 11a and 12a. The tumble swirl facilitating mask 34 is provided with an inner edge along edges of the primary and secondary port openings 4a and 5a and projected to the center of the cylinder between the openings 4a and 5a to form a triangle like configuration.

When the S-valve is opened, basically, the swirl flow is produced through the primary port 4 and the tumble flow is produced through the secondary port 5. It should however be noted that when the swirl flow and tumble flow are interfered with each other, they are weakened by another. In view of this, the swirl break mask and tumble swirl facilitating mask are provided. That is, the swirl break mask 33 and tumble swirl facilitating mask 34 restrict directions of the intake gas flow for producing the swirl and tumble flows so as to produce the swirl along the circumferential wall of the combustion chamber and produce the tumble in the central area of the chamber 6 not to interfere the swirl. Thus, the swirl and tumble flows coexist to obtain an improved combustion characteristic.

In FIG. 10, around TDC of the compression stroke, the swirl flow as shown by an arrow Y1 is produced in the vicinity of the primary port 4. In this situation, the depth of the combustion chamber is reduced so that the tumble flow disappears and the reverse swirl as shown by arrow Y2 is produced in the vicinity of the secondary port 5. These swirl and reverse swirl are reflected to the ignition plug 8 and intermingled with each other around the plug 8. As a result, a strong turbulence is produced around the plug 8 so that a combustion speed of the intake gas is enhanced to improve the ignition and combustion characteristics.

As aforementioned, the primary inclination angle α between the primary port axis L1 and the cylinder cross section plane A1 is set at a relatively small value. Thus, it is difficult to form an independent water jacket under the primary port 4 within the cylinder head H. In view of this, in the illustrated embodiment, a water jacket 36 of the cylinder head H is communicated with a water jacket 37 of the cylinder block B by so called open deck way. The cylinder head H is connected with the cylinder block through a gasket (not shown).

FIGS. 12 through 16, the fuel injection valve 15, in a plan view, is disposed offset from the primary port axis L1 to the outer side opposite to the secondary port 5 in the straight portion 4b of the primary port 4. The injection nozzle thereof is oriented to a direction of a straight line L1 crossing the line L1 to be directed to the plug 8. An injection angle J1 is set at a relatively small value, for example 10 degree. Spraying area of the fuel around opening of is shown by areas R1 in FIG. 13 and R2 in FIG. 15. Therefore, the fuel injected does not hit the wall of the primary port 4.

As a result, the fuel injected from the valve 15 reaches the combustion chamber 6 without contacting with the port wall 4 and concentrated around the plug 8 so that the combustion of the fuel is facilitated. In addition, a centrifugal force acting on the intake gas in the curved portion 4c in the primary port 4 reflects the fuel toward the center of the cylinder 1. This also facilitates the concentration of the fuel around the ignition plug 8.

Figure 12:
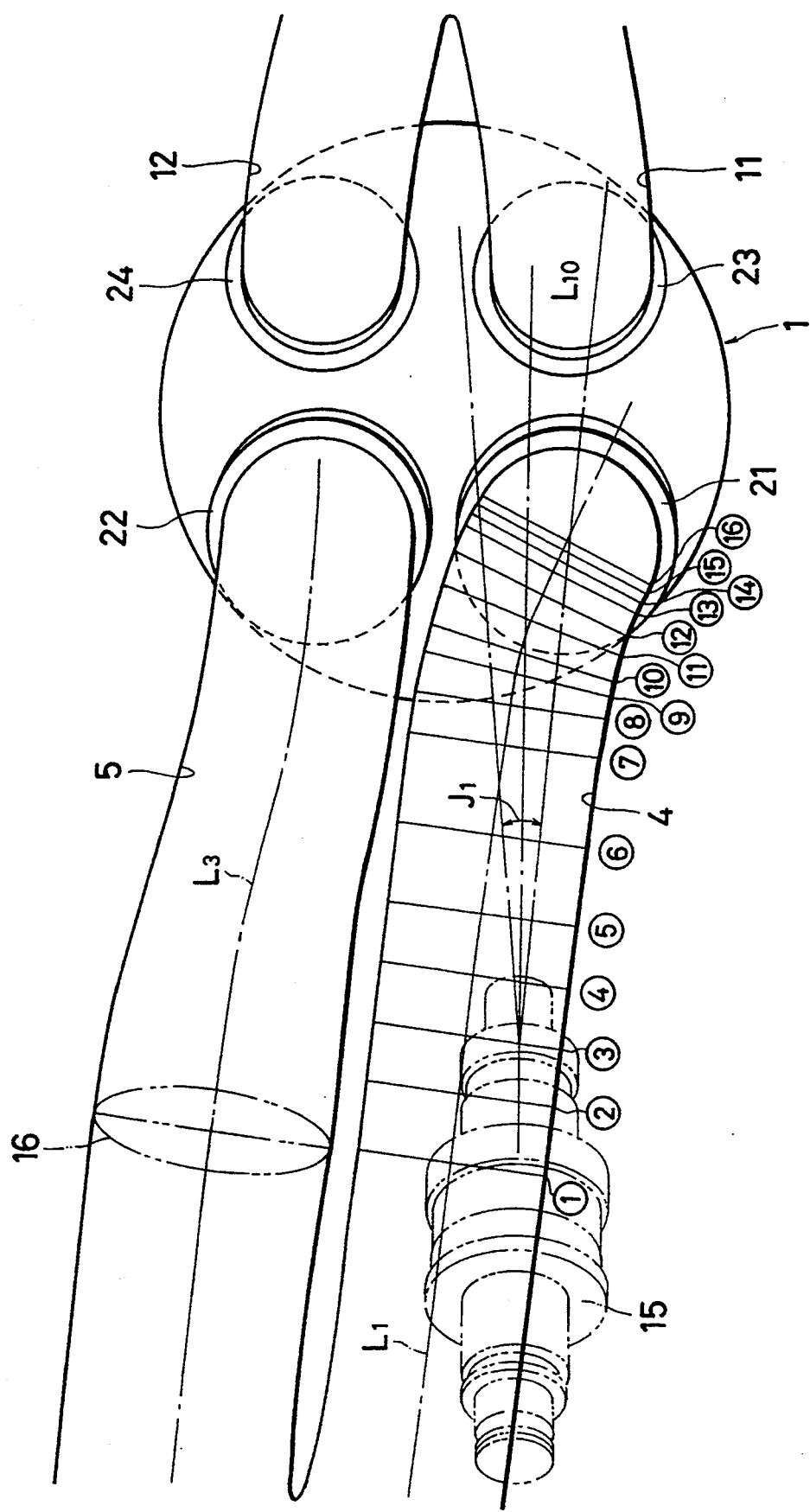
FIG. 12 is a plan view around the cylinder.
Figure 13:
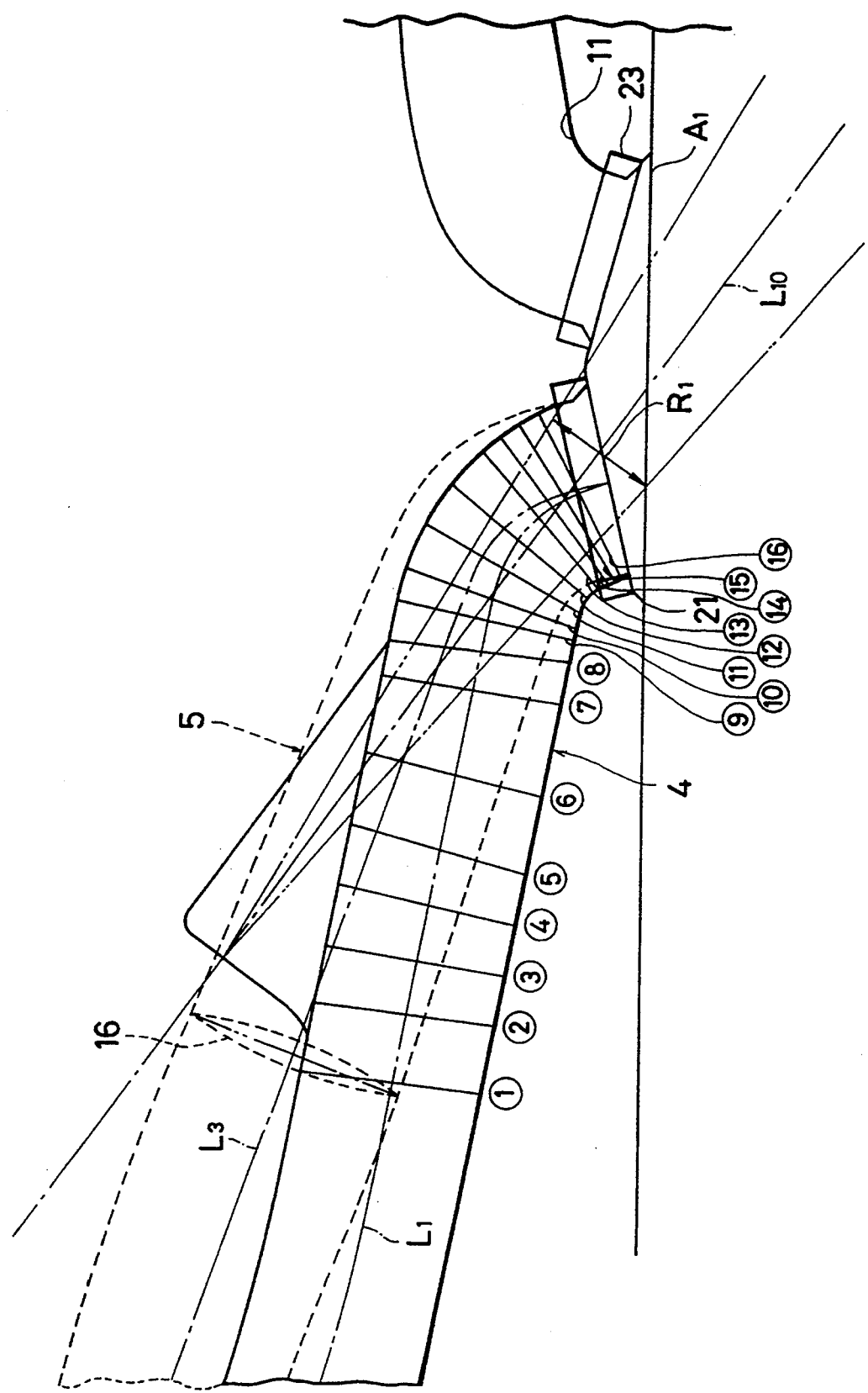
FIG. 13 is a elevational view showing the intake and exhaust ports.
Figure 14:
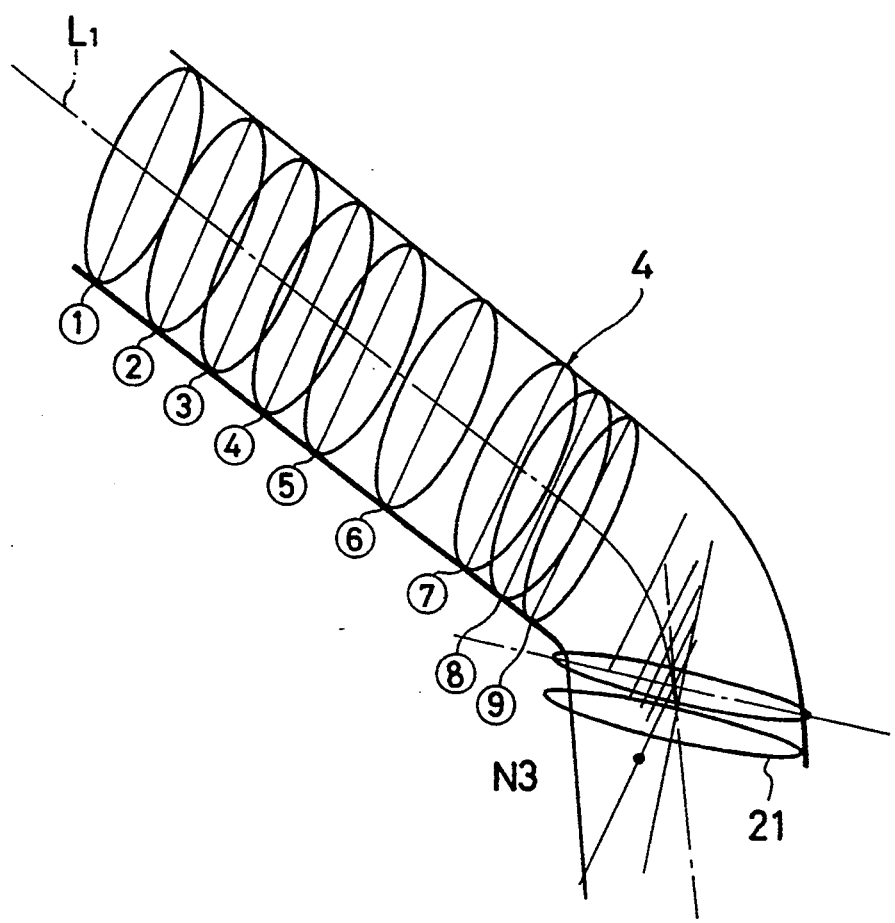
FIG. 14 is an elevational view of the primary port.
Figure 15:
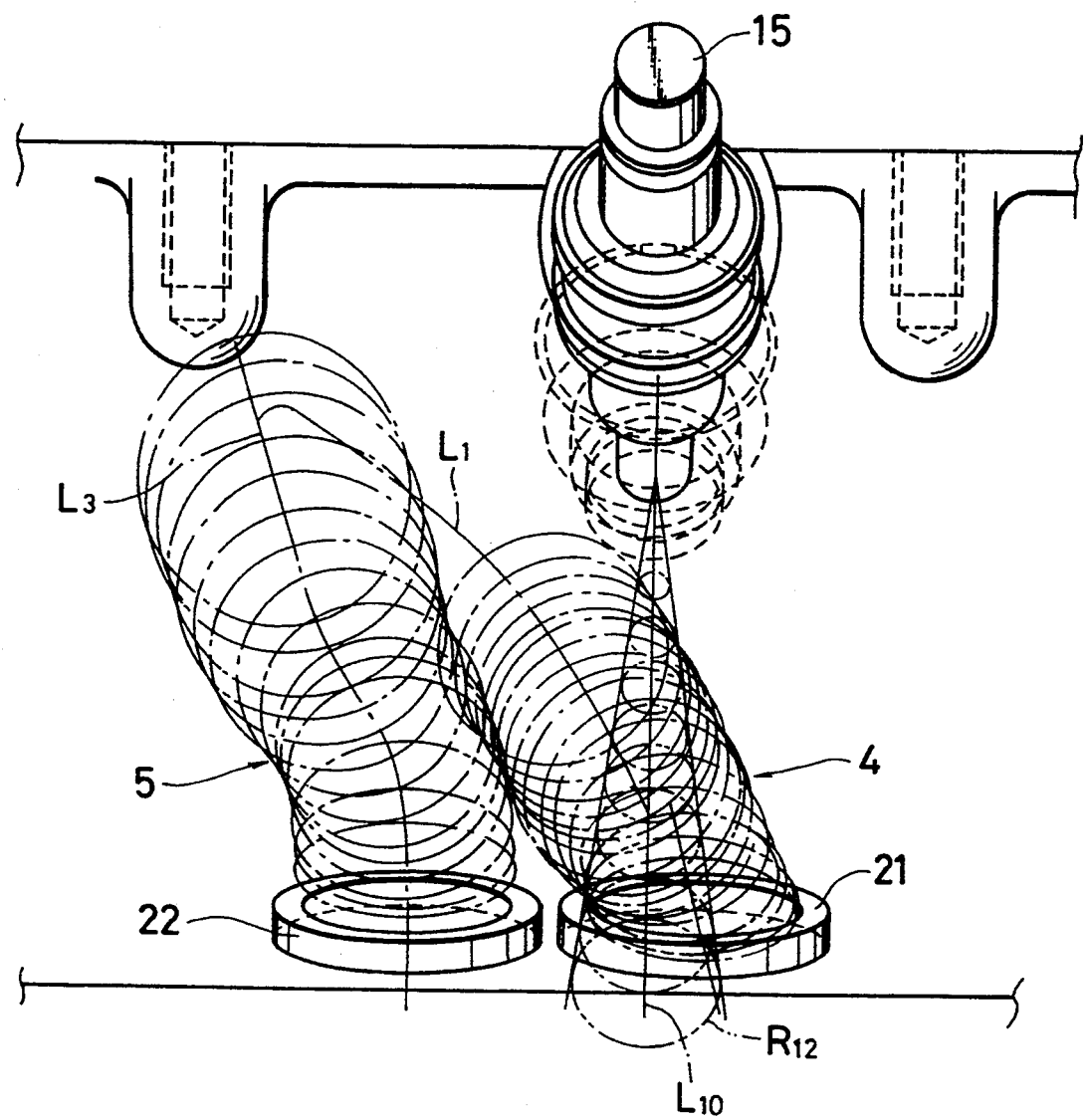
FIG. 15 is a perspective view showing a curvature and cross sectioned configuration of the primary and secondary ports.

In order to facilitate the understanding of the configuration of the primary port 4, the ports 4 are shown by contour lines with numerals in FIGS. 12 through 14. In FIGS. 15 and 16, curvatures of the primary and secondary ports are shown by perspective views.

According to the present invention, when the engine load is low, the strong swirl flow is produced to establish the laminate introduction of the intake gas so that the ignition and combustion characteristics of the intake gas are improved. In the intermediate engine load condition, the swirl and tumble flows coexist to improve combustion characteristic and anti-knocking characteristic. In the high engine load condition, the strong tumble flow improves the anti-knocking characteristic and enhance the engine output characteristic.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An engine intake system comprising:
a primary port for introducing intake gas throughout an entire engine operating condition and having an axis, and
a secondary port provided with a gate valve which is opened in a high engine load condition for introducing the intake gas and having an axis,
both axes being inclined to one side with regard to a camshaft axis as seen along a cylinder bore axis of an engine,
the axis of the primary port being inclined at an angle larger than an angle at which the axis of the secondary port is inclined with regard to the cylinder bore axis of the engine as seen along the camshaft axis,
a ratio of a tumble flow to a swirl flow being gradually increased as the gate valve is operated from an entirely closed condition to a fully open condition.

2. An engine intake system comprising:
a primary port for introducing intake gas throughout an entire engine operating condition, and
a secondary port provided with a gate valve which is opened in a high engine load condition for introducing the intake gas,
wherein both axes of the primary and secondary ports are inclined to one side with regard to a camshaft axis in a view along a cylinder bore axis of the engine,
the secondary port being disposed in such a manner that the secondary port axis is substantially directed to an ignition plug disposed in a substantially central portion of a cylinder bore of the engine,
a primary port curved portion is provided adjacent to a port opening located at a downstream end of the primary port and continued to a combustion chamber of the engine, a secondary port curved portion is provided adjacent to a port opening located at a downstream end of the secondary port and continued to the combustion chamber of the engine, a primary port straight portion is extended upstream from the primary port curved portion, a secondary port straight portion is extended upstream from the secondary port curved portion, and the primary port and secondary port straight portions are provided so that a distance between the primary port axis and secondary port axis is reduced to the downstream thereof in a view along the cylinder axis.

3. An engine intake system as recited in claim 2 wherein a distance between the primary port and secondary port is reduced to the downstream thereof.

4. An engine intake system as recited in claim 2 wherein the primary port is curved abruptly compared with the secondary port around the downstream end thereof in the view along the cylinder axis.

5. An engine intake system as recited in claim 3 wherein the gate valve is provided with a rotation shaft extending substantially in parallel with the cylinder axis and a valve body for rotating about the shaft so as to control an opening of the secondary port, the valve body rotating in such a manner that a portion of the valve body close to the primary port moves upstream to open the secondary port.

6. An engine intake system as recited in claim 5 wherein an injection valve is provided in the primary port, an injection center line of the injection valve crossing a primary port axis to be directed substantially to an ignition plug disposed in the central area of the cylinder bore in the view along the cylinder axis.

7. An engine intake system as recited in claim 2 wherein an angle between the secondary port axis and a plane perpendicular to the cylinder axis has a relatively large value compared with the primary port so as to facilitate producing a tumble flow in the combustion chamber.

8. An engine intake system as recited in claim 2 wherein a secondary port orientation angle between the secondary port axis at the secondary port opening and a straight line passing through the center of the secondary port opening and the center of a first exhaust port opening facing the primary port opening is provided to have a relatively large value so that intake gas from the secondary port is directed to the central portion of the combustion chamber.

9. An engine intake system comprising:
a primary port for introducing intake gas throughout an entire engine operating condition, and
a secondary port provided with a gate valve which is opened in a high engine load condition for introducing the intake gas,
wherein a primary port inclination angle $\alpha$ between an axis of the primary port straight portion and a plane perpendicular to a cylinder axis is provided at a small value compared with the secondary port in a view along a camshaft axis,
the angle $\alpha$, a primary intake valve inclination angle $\theta$ between an axis of a primary intake valve and the cylinder axis, a first exhaust valve inclination angle $\theta'$ between an axis of a first exhaust valve facing the primary intake valve and the cylinder axis and a valve body angle $\beta$ between upper and lower surfaces of the valve body of the primary intake valve satisfying the following condition in a view along the cam shaft axis:

$\beta > \theta$ and $\alpha < \theta'$.

10. An engine intake system comprising:
a primary port for introducing intake gas throughout an entire engine operating condition, and
a secondary port provided with a gate valve which is opened in a high engine load condition for introducing the intake gas,
wherein a primary port inclination angle $\alpha$ between an axis of the primary port straight portion and a plane perpendicular to a cylinder axis is provided at a small value compared with the secondary port in a view along a camshaft axis and the combustion chamber is of a pentroof configuration, the primary port inclination angle $\alpha$, the primary intake valve inclination angle $\theta$, a roof inclination angle $\theta''$, between a roof surface of the combustion chamber in the vicinity of an exhaust valve and a plane perpendicular to the cylinder axis and the valve body angle $\beta$ satisfying the following condition in a view along the camshaft axis:

$\beta > \theta$ and $\alpha < \theta''$.

11. An engine intake system as recited in claim 10 wherein the primary port inclination angle $\alpha$, the primary intake valve inclination angle $\theta$, the roof inclination angle $\theta''$ and the valve body angle $\beta$ further satisfy following condition;

$\alpha < \theta$.

12. An engine intake system as recited in claim 9 wherein the primary port axis is curved to a circumferential wall of the combustion chamber in the vicinity of the port opening in a view along the cylinder axis.

13. An engine intake system as recited in claim 9 wherein the primary port is provided with a valve seat formed with a through hole which extends along a straight line inclined toward the primary port axis at the primary port straight portion from a tangential line at the primary port opening on the primary port axis by a predetermined angle in a view along the camshaft axis.

14. An engine intake system as recited in claim 9 wherein the primary port is formed with a curved portion in the vicinity of the valve seat, an end point of the curved portion in the primary port axis is located downstream of an upstream end of the valve seat.

15. An engine intake system as recited in claim 9 wherein a curvature R of the primary port axis of a curved portion in the vicinity of the valve seat and a primary port diameter in the curved portion satisfies the following condition;

$0.9 = < R/D = < 1.2$.

16. An engine intake system as recited in claim 15 wherein an end point of a curvature of the primary port axis in a curved portion in which the primary port curves to a circumferential wall of the combustion chamber is located downstream of a start point of a curvature of the primary port axis in the vicinity of the valve seat.

17. A control method for controlling an engine intake system comprising the steps of:

introducing intake gas through a primary port to form swirl flow in a combustion chamber of an engine in a low engine load condition, introducing the intakes gas through a secondary port by opening a gate valve disposed in the secondary port to form a tumble flow as the engine load is increased, axes of both the primary port and the secondary port being inclined to one side with regard to a camshaft axis as seen along a cylinder bore axis of the engine, the axis of the primary port being inclined at an angle larger than an angle at which the axis of the secondary port is inclined with respect to the cylinder bore axis of the engine as seen along the camshaft axis, and controlling opening of the gate valve in such a manner that a ratio of the tumble flow to the swirl flow is gradually increased as the gate valve is operated from an entirely closed condition to a fully open condition.

18. An engine intake system as recited in claim 2, wherein a ratio of a tumble flow to a swirl flow is gradually increased as the gate valve is operated from an entirely closed condition to a fully open condition.

19. An engine intake system as recited in claim 9, wherein a ratio of a tumble flow to a swirl flow is gradually increased as the gate valve is operated from an entirely closed condition to a fully open condition.

20. An engine intake system as recited in claim 10, wherein a ratio of a tumble flow to a swirl flow is gradually increased as the gate valve is operated from an entirely closed condition to a fully open condition.

* * * * *